United States Patent
Maeda et al.

(10) Patent No.: US 11,247,129 B2
(45) Date of Patent: Feb. 15, 2022

(54) INFORMATION PROCESSING SYSTEM, INFORMATION PROCESSING APPARATUS, INFORMATION PROCESSING SERVER, STORAGE MEDIUM AND INFORMATION PROCESSING METHOD

(71) Applicant: NINTENDO CO., LTD., Kyoto (JP)

(72) Inventors: Kouhei Maeda, Kyoto (JP); Yuji Ohashi, Kyoto (JP); Shioe Ohashi, Kyoto (JP); Mai Kusakihara, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 331 days.

(21) Appl. No.: 16/129,122

(22) Filed: Sep. 12, 2018

(65) Prior Publication Data

US 2019/0076740 A1    Mar. 14, 2019

(30) Foreign Application Priority Data

Sep. 13, 2017  (JP) .............................. JP2017-176086

(51) Int. Cl.
  *A63F 13/69*  (2014.01)
  *A63F 13/58*  (2014.01)
(52) U.S. Cl.
  CPC .............. *A63F 13/69* (2014.09); *A63F 13/58* (2014.09); *A63F 2300/609* (2013.01)
(58) Field of Classification Search
  None
  See application file for complete search history.

(56) References Cited

U.S. PATENT DOCUMENTS

| 4,858,930 | A  | * | 8/1989  | Sato     | A63F 13/10  |
|           |    |   |         |          | 463/23      |
| 5,720,663 | A  | * | 2/1998  | Nakatani | A63F 13/005 |
|           |    |   |         |          | 463/23      |
| 5,961,386 | A  | * | 10/1999 | Sawaguchi| G07F 17/3288|
|           |    |   |         |          | 463/25      |
| 7,374,480 | B2 | * | 5/2008  | Otani    | A63F 13/10  |
|           |    |   |         |          | 463/8       |
| 8,105,160 | B2 | * | 1/2012  | Kando    | A63F 13/58  |
|           |    |   |         |          | 463/31      |

(Continued)

OTHER PUBLICATIONS

InfinityWard, Ghosts Training: Squad Points and Prestige, Nov. 27, 2013, https://www.youtube.com/watch?v=aSFHU4Zug_o, p. 1 (Year: 2013).*

(Continued)

*Primary Examiner* — Tramar Harper
(74) *Attorney, Agent, or Firm* — Scully, Scott, Murphy & Presser, P.C.

(57) ABSTRACT

A game apparatus functioning as a non-limiting example information processing apparatus includes a CPU that performs processing of a battle game. A player selects one or more usage characters that are to be used in the battle game among possession characters. In the battle game, if the usage character used by the player defeats one or more enemy character, a character value is added to each usage character according to a predetermined rule other than an experience value by battle. Every time the predetermined number of character values are accumulated, a shared item is acquired, and if this shared item is used, a rarity of a possession character is increased.

28 Claims, 14 Drawing Sheets

(56) References Cited

U.S. PATENT DOCUMENTS

| | | | | |
|---|---|---|---|---|
| 8,187,094 | B2* | 5/2012 | Sawada | G04B 19/12 463/36 |
| 2004/0204212 | A1* | 10/2004 | Sato | A63F 13/10 463/5 |
| 2006/0183521 | A1* | 8/2006 | Hamamoto | A63F 13/422 463/8 |
| 2007/0060233 | A1* | 3/2007 | Liccardo | A63F 13/12 463/8 |
| 2007/0076015 | A1* | 4/2007 | Tanabe | A63F 13/822 345/619 |
| 2009/0156302 | A1* | 6/2009 | Narita | A63F 13/795 463/29 |
| 2011/0312395 | A1* | 12/2011 | Nakamura | A63F 13/69 463/4 |
| 2011/0312407 | A1* | 12/2011 | Sakurai | A63F 13/63 463/23 |
| 2013/0252682 | A1* | 9/2013 | Umekawa | A63F 13/422 463/1 |
| 2013/0288762 | A1* | 10/2013 | Yoshie | A63F 13/25 463/8 |
| 2014/0004937 | A1* | 1/2014 | Inagawa | A63F 13/00 463/29 |
| 2014/0038719 | A1* | 2/2014 | Kobayashi | A63F 13/69 463/40 |
| 2014/0080595 | A1* | 3/2014 | Suga | A63F 13/12 463/31 |
| 2014/0121026 | A1* | 5/2014 | Hashimoto | A63F 13/69 463/42 |
| 2014/0200083 | A1* | 7/2014 | Tabata | A63F 13/47 463/42 |
| 2014/0335954 | A1* | 11/2014 | Takagi | A63F 13/80 463/31 |
| 2016/0144276 | A1* | 5/2016 | Ukai | A63F 13/69 463/31 |
| 2016/0144284 | A1* | 5/2016 | Izu | A63F 13/58 463/43 |

OTHER PUBLICATIONS

Call of Duty Ghosts, Mar. 16, 2015, https://web.archive.org/web/20150316084339/http:/www.codghosts.net/create-a-soldier-prestige-squad-points/, p. 1 (Year: 2015).*

IGN, Call of Duty: Ghosts (IGN), Mar. 27, 2015, https://web.archive.org/web/20150327011150/https:/www.ign.com/games/call-of-duty-ghosts , p. 1 (Year: 2015).*

IGN, Call of Duty: Ghosts Squads—Building Your Squad (Next-Gen 1080p), Oct. 22, 2013, https://www.youtube.com/watch?v=_CtmPaZ_nqk , p. 1 (Year: 2013).*

[Tips and Tricks for FE Heroes] Summary of how to "awaken" heroes and how to obtain necessary materials efficiently! Let's awaken heroes and learn powerful skills!, Boom App Games [online], dated Feb. 6, 2017, [searched on Nov. 13, 2018], <URL, https://game.boom-app.com/entry/fire-emblem-heroes-play-04>.

[Tips and Tricks for FE Heroes] Summary of what the beginners just getting started should do in the beginning! Let's train various heroes and conquer battles!, Boom App Games [online], dated Feb. 3, 2017, [searched on Nov. 13, 2018], <URL, https ://game.boom-app.com/entry/fire-emblem-heroes-play-01 >.

[Alternative Girls] How to increase the degree of intimacy? Let's add training members to your daily routine!, GAMY [online], dated Nov. 30, 2016, [searched on Nov. 13, 2018], <URL, https://gamy.jp/alterna/alterna-beginner04>.

[Tips and Tricks for Fire Emblem Heroes] Tips for raising levels and earning experience point efficiently, FamitsuApp [online], dated Feb. 15, 2017, [searched on Nov. 13, 2018], <URL, https://app.famitsu.com/20170209966560/>.

[Tips and Tricks for FE Heroes] "Genkai Toppa (Limit Break)" should be done right away? Explanation of the method and effect, meaning! Introduction of strategy information about the beginning of the game that beginners just getting started must-read!, Boom App Games [online], dated Feb. 6, 2017, [searched on Nov. 13, 2018], <URL, https://game.boom-app.com/entry/fire-emblem-heroes-play-03>.

It has become a different game!? Have you already experienced "Shinobi Nightmare" which was reborn by big update? FamitsuApp [online], dated Dec. 6, 2016, [searched on Nov. 13, 2018], <URL, https://app.famitsu.com/20161206_897896/>.

Hortensia Saga, Let's Release "Kishiden (Record of the Knight)" and "Awakening" by raising episode levels!, GAMY [online], dated May 29, 2015, [searched on Jun. 10, 2019], <URL, https://gamy.jp/horsaga/horsaga-Episode-level/>.

Hortensia Saga, Review. "Check Out the kishi dan sen (knights' battle), where up to 400 people are mixed up!", Dengeki Online [online], dated Apr. 15, 2015, [searched on Jun. 11, 2019], <URL, https://dengekionline.com/elem/000/001/036/1036349/>.

Japanese Office Action dated Jun. 25, 2019 received in Japanese Patent Application No. 2017-176086.

https://support.pokemongo.nianticlabs.com/hc/ja/articles/226372187-%E7%9B%B8%E6%A3%92%E3%83%9D%E3%82%B1%E3%83%A2%E3%83%B3, "Buddy Pokémon", printed Jul. 4, 2018, together with an English language translation.

* cited by examiner

INFORMATION PROCESSING SYSTEM, INFORMATION PROCESSING APPARATUS, INFORMATION PROCESSING SERVER, STORAGE MEDIUM AND INFORMATION PROCESSING METHOD

CROSS REFERENCE OF RELATED APPLICATION

The disclosure of Japanese patent application No. 2017-176086 filed on Sep. 13, 2017 is incorporated by reference.

FIELD

This application describes an information processing system, information processing apparatus, information processing server, storage medium and an information processing method, using contents a user owns for predetermined information processing.

SUMMARY

It is a primary object of an embodiment(s) to provide a novel information processing system, information processing apparatus, information processing server, storage medium and information processing method.

Moreover, it is another object of the embodiment(s) to provide a information processing system, information processing apparatus, information processing server, storage medium and information processing method, to improve the use of various contents.

A first embodiment is an information processing system, comprising: a processing system that includes one or more processors, the processing system configured to: store in a storage a plurality of possession contents owned by a user; store in a storage a first parameter value associated with each of the possession contents; store in a storage a second parameter value; select at least one possession content among the plurality of possession contents as a usage content to be used for predetermined information processing; change the first parameter value associated with the possession content that is selected as the usage content based on a result of the predetermined information processing; change the second parameter value according to each first parameter value; and change any at least one of the possession contents to a further possession content with utilizing the second parameter value.

According to the first embodiment, since the second parameter value is changed according to the first parameter value that is changed by using the usage content for the predetermined information processing, it improves the use of various contents without fixing the usage content.

A second embodiment is the information processing system according to the first embodiment, wherein the processing system is configured to change at least one possession content the user selects out of the possession contents to a further possession content.

According to the second embodiment, it is possible to change the possession content the user desires to a further possession content.

A third embodiment is the information processing system according to the first embodiment, wherein the processing system is configured to increase or decrease the first parameter value, and an upper limit or a lower limit is set to the first parameter value.

According to the third embodiment, since a limit is set on the increase or decrease of the first parameter value based on which the second parameter value is changed, when the first parameter value of the usage content reaches the upper limit value or the lower limit value, other possession contents are used.

A fourth embodiment is the information processing system according to the first embodiment, wherein the processing system is configured to store a first parameter value associated in common with a group that a plurality of possession contents belong.

According to the fourth embodiment, since the first parameter value that is associated in common with the group, if a plurality of possession contents in the group are simultaneously used, it is possible to increase or decrease the first parameter value for a short period of time.

A fifth embodiment is the information processing system according to the fourth embodiment, wherein groups are classified with the same type of possession contents.

According to the fifth embodiment, it is possible to increase or decrease the first parameter value for a short period of time by using the same type of possession contents simultaneously.

A sixth embodiment is the information processing system according to the fifth embodiment, wherein the group includes a plurality of possession contents having different ranks.

A seventh embodiment is the information processing system according to the sixth embodiment, wherein the rank is a rarity in acquiring a content out of a plurality of contents by lottery as a possession content.

An eighth embodiment is the information processing system according to the sixth embodiment, wherein the further content has a rank higher than a rank of the possession content.

According to the eighth embodiment, it is possible to own the further content with a higher rank according to changing the first parameter value.

A ninth embodiment is the information processing system according to the first embodiment, wherein the predetermined information processing is performing of game play with using the usage content, and the processing system is configured to change the possession content to the further possession content so as to be advantageous in the game play.

According to the ninth embodiment, since it becomes advantageous in game play to change the possession content to the further possession content, it is possible to improve the use of various possession contents so as to change the first parameter value and the second parameter value in a short period of time.

A tenth embodiment is the information processing system according to the ninth embodiment, wherein the game play is performing of a battle, and the processing system is configured to largely change the first parameter value as an opponent of the usage content is stronger.

An eleventh embodiment is the information processing system according to the ninth embodiment, wherein the game play is performing of a battle, and the processing system is configured to largely change the first parameter value as strength of an opponent against the usage content is nearer strength of the usage content.

A twelfth embodiment is the information processing system according to the ninth embodiment, wherein the battle is to make at least one usage content fight against an opponent, and the processing system is configured to change the first parameter value when the usage content is in a state enable to fight at a predetermined time.

A thirteenth embodiment is the information processing system according to the first embodiment, wherein the processing system is configured to select a plurality of possession contents as the usage contents, and to change the first parameter value for each of the plurality of usage contents.

According to the thirteenth embodiment, since the first parameter value is individually changed with respect to the plurality of usage contents, when the first parameter value reaches the upper limit or the lower limit, other possession contents may be used.

A fourteenth embodiment is the information processing system according to the thirteen the embodiment, wherein the same type contents are included in the plurality of possession contents, and the processing system is configured to select the same type of possession content as the usage content.

According to the fourteenth embodiment, when the same type of possession contents are selected as the usage contents, a change amount of the first parameter value can be increased as compared with a case where the possession content is solely selected as the usage content.

A fifteenth embodiment is the information processing system according to the first embodiment, wherein the processing system is configured to change the second parameter value at every time the first parameter value exceeds a predetermined threshold value.

A sixteenth embodiment is the information processing system according to the first embodiment, wherein the second parameter value is increased by abandoning the possession content.

According to the sixteenth embodiment, by abandoning undesired possession content, for example, the second parameter value can be increased.

A seventeenth embodiment is the information processing system according to the first embodiment, wherein the processing system is further configured to display the possession contents in a list together with the first parameter values.

According to the seventeenth embodiment, it is possible to know at a glance a usage frequency of the each of the possession contents.

An eighteenth embodiment is an information processing apparatus, comprising: a processing system that includes one or more processors, the processing system is configured to: store in a storage a plurality of possession contents owned by a user; store in a storage a first parameter value associated with each of the possession contents; store in a storage a second parameter value; select at least one possession content among the plurality of possession contents as a usage content to be used for predetermined information processing; change the first parameter value associated with the possession content that is selected as the usage content based on a result of the predetermined information processing; change the second parameter value according to each first parameter value; and change any at least one of the possession contents to a further possession content with utilizing the second parameter value.

A nineteenth embodiment is an information processing server, comprising: a processing system that includes one or more processors, the processing system is configured to: store in a storage a plurality of possession contents owned by a user; store in a storage a first parameter value associated with each of the possession contents; store in a storage a second parameter value; select at least one possession content among the plurality of possession contents as a usage content to be used for predetermined information processing; change the first parameter value associated with the possession content that is selected as the usage content based on a result of the predetermined information processing; change the second parameter value according to each first parameter value; and change any at least one of the possession contents to a further possession content with utilizing the second parameter value.

A twentieth embodiment is a non-transitory computer readable storage medium storing an information processing program that is executable by one or more processors of a computer, wherein the program causes the one or more processors to perform: storing in a storage a plurality of possession contents owned by a user; storing in a storage a first parameter value associated with each of the possession contents; storing in a storage a second parameter value; selecting at least one possession content among the plurality of possession contents as a usage content for being used for predetermined information processing; changing the first parameter value associated with the possession content that is selected as the usage content based on a result of predetermined information processing; changing the second parameter value according to a value of each first parameter; and changing any at least one of possession contents to a further possession content with utilizing the second parameter value.

A twenty-first embodiment is an information processing method performed by one or more processors of a computer, wherein the method causes the one or more processors to execute: (a) storing in a storage a plurality of possession contents owned by a user; (b) storing in the storage a first parameter value associated with each of the possession contents; (c) storing in the storage a second parameter value; (d) selecting at least one possession content among the plurality of possession contents as a usage content for being used for predetermined information processing; (e) changing the first parameter value associated with the possession content that is selected as the usage content based on a result of predetermined information processing; (f) changing the second parameter value according to a value of each first parameter; and (g) changing any at least one of possession contents to a further possession content with utilizing the second parameter value.

According to each of the eighth embodiment to the twenty-first embodiment like the first embodiment, it is possible to improve the use of various contents.

The above described objects and other objects, features, aspects and advantages of the embodiment(s) will become more apparent from the following detailed description when taken in conjunction with the accompanying drawings.

DETAILED DESCRIPTION OF NON-LIMITING EXAMPLE EMBODIMENTS

Figure 1:
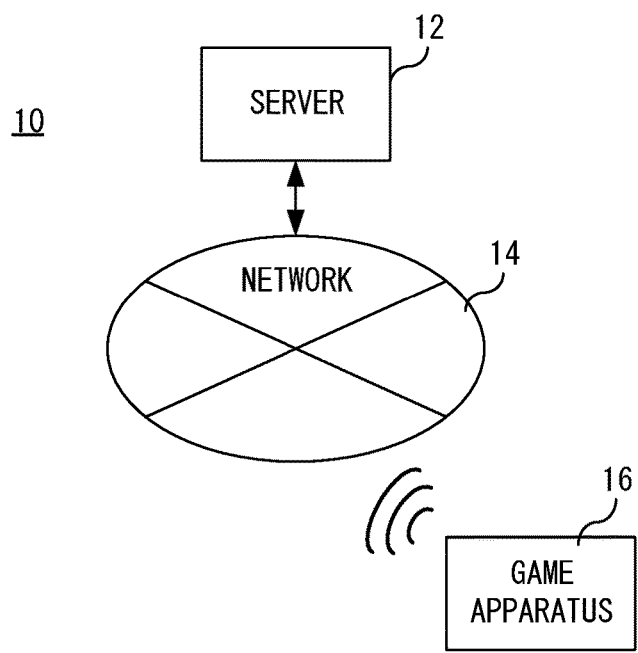
FIG. 1 is illustration view showing a non-limiting example game system.

With reference to FIG. 1, a non-limiting example information processing system 10 includes a server 12, and the server 12 is communicably connected with a game apparatus 16 via a network 14 such as Internet.

The server (information processing server) 12 is a general-purpose server, and comprises circuit components such as a CPU, a memory (HDD, ROM, RAM, etc.), a communication module, etc. The server 12 stores (manages) game data (player data 504c shown in FIG. 11) of a virtual game that is played in the game apparatus 16 of this embodiment in an internal memory or a data base connected to an outside in association with information of the game apparatus 16 (or a user or player).

The game apparatus 16 is an example of an information processing apparatus, and may be not only a game dedicated apparatus but various kinds of electronic devices having a game function. The electronic devices may be a smartphone, a portable telephone (feature phone), a tablet PC, a notebook PC, etc., for example. However, there is no necessity of being limited to a portable electronic device, and a stationary electronic device such as a game apparatus, an arcade game apparatus, a desktop PC, etc. can be used.

Figure 2:
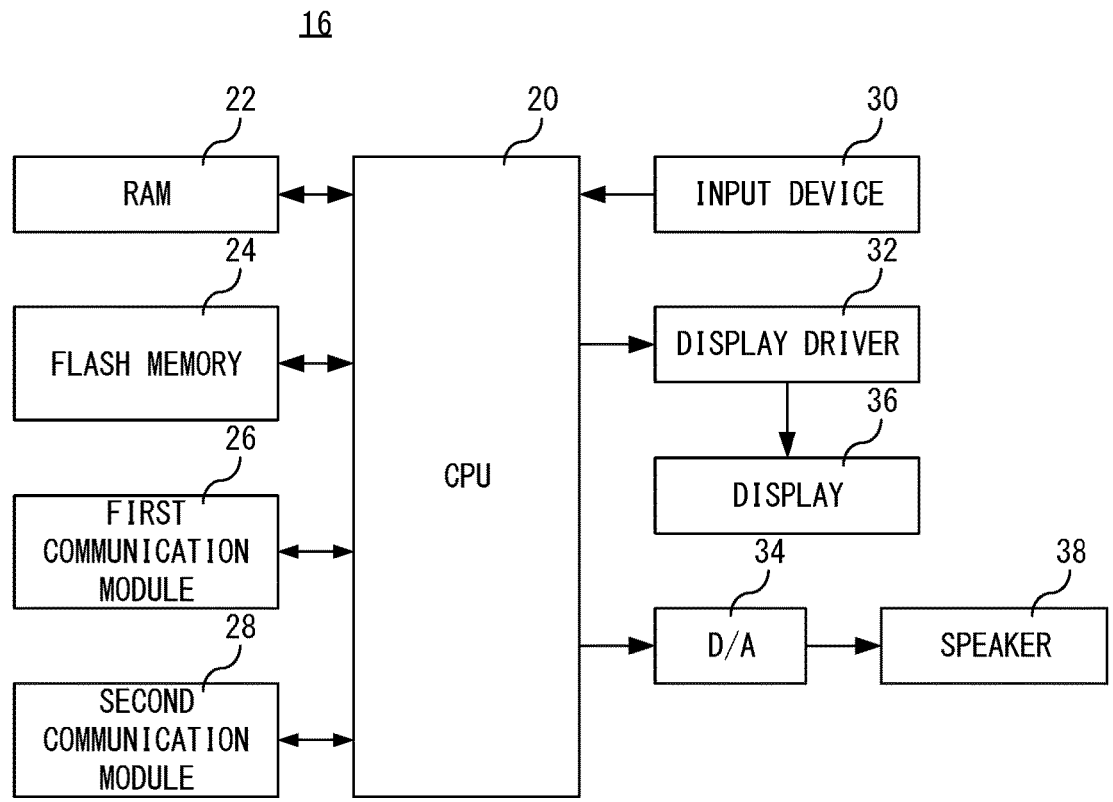
FIG. 2 is a block diagram showing non-limiting example electric structure of the game apparatus shown in FIG. 1.

FIG. 2 is a block diagram showing non-limiting example electric structure of the game apparatus 16 shown in FIG. 1. As shown in FIG. 2, the game apparatus 16 includes a CPU 20, and the CPU 20 is connected with a RAM 22, a flash memory 24, a first communication module 26, a second communication module 28, an input device 30, a display driver 32 and a D/A converter 34. Moreover, a display 36 is connected to the display driver 32, and a speaker 38 is connected to the D/A converter 34.

The CPU 20 is in charge of overall control of the game apparatus 16. The RAM 22 is a volatile storage medium, and used as a working memory and a buffer memory for the CPU 20. The flash memory 24 is a nonvolatile storage medium, and used in order to store application program such as a game, and store (save) various kinds of data.

However, there is no necessity that an application is limited to a game application, and it is possible to perform various kinds of application such as a document production application, an email application, a painting application, character or letter practice application, a linguistic training application, a learning application, etc.

The first communication module 26 has a function to access a wireless LAN according to the standard of IEEE802.11.b/g, for example. Therefore, the CPU 20 transmits or receives data to or from other devices (server, other game apparatuses 10, etc.) via an access point and Internet (network) with using the first communication module 26, for example. However, it is also possible to transmit or receive data to or from other device directly with using the first communication module 26.

The second communication module 28 has a function to perform a short-distance wireless communication. Specifically, the second communication module 28 has a function to transmit or receive an infrared signal to or from other devices (other game apparatuses etc.) with a predetermined communication system (infrared ray system, for example), and a function to perform wireless communication with the same or similar kind of game apparatus according to a predetermined communication protocol (multilink protocol, for example). Therefore, the CPU 20 can transmit or receive data to or from the same or similar kind of other game apparatuses directly with using the second communication module 28, for example. However, instead of the short-distance wireless communication of an infrared ray system, short-distance wireless communication according to other wireless communication standards such as Bluetooth (registered trademark) may be performed.

The input device 30 includes various kinds of push buttons or switches that are provided on the game apparatus 16, for example, and is used by a user or player (hereinafter, simply referred to as "player") for various kinds of operations such as menu selection and a game operation. However, as the input device 30, instead of the push buttons or switches, or together with the push buttons or switches, an input portion such as a pointing device (a touch panel etc., for example), a microphone, a camera, etc. may be provided. Moreover, the touch panel may be built into a display 36 to be described later. The display 36 in this case is a touch panel integrated type display.

The display driver 32 is used in order to display various kinds of images such as a game image on the display 36 under instructions of the CPU 20. Although illustration is omitted, the display driver 32 contains a video RAM (VRAM).

The D/A converter 34 converts sound data applied from the CPU 20 into an analog game sound so as to output to the speaker 38. In addition, the game sound means a sound required for the game, such as a sound of a game character or object, sound effect and music (BGM).

In addition, the electric structure of the game apparatus 16 shown in FIG. 1 is a mere example, and it does not need to be limited to this. For example, the second communication module 28 may be dispensed with.

Figure 3:
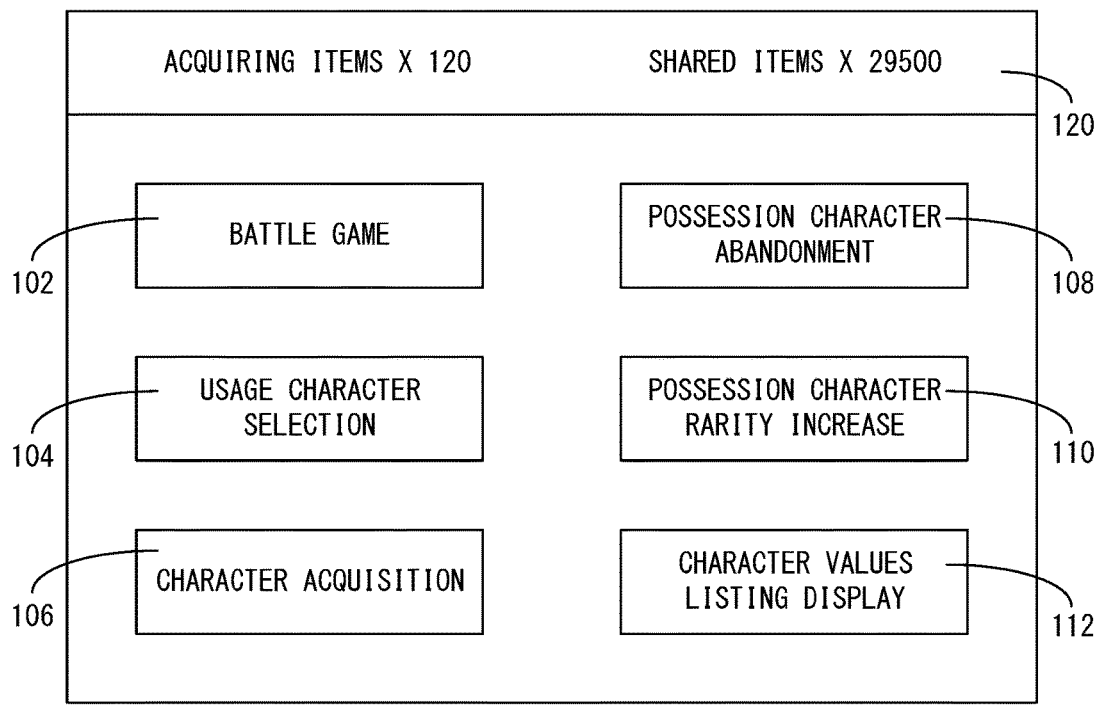
FIG. 3 is an illustration view showing a non-limiting example main menu screen to be displayed on a display shown in FIG. 2.

FIG. 3 is an illustration view showing a non-limiting example main menu screen 100 that is initially displayed on the display 36 when starting an application of a virtual game that is played on the game apparatus 16 shown in FIG. 1.

A plurality of buttons 102, 104, 106, 108, 110 and 112 are provided in the main menu screen 100. The button 102 is a button (icon) for playing a battle game. The button 104 is a button for performing processing for selecting a character that is used in the battle game (usage character) among characters that player owns (possession characters). However, the possession characters include a character previously allocated at a start of the game and a character acquired separately. The button 106 is a button for performing processing for acquiring a character.

The button 108 is a button for performing processing for abandoning a possession character. The button 110 is a button for performing processing for increasing a degree of rareness (rarity) of a possession character. The button 112 is a button for performing processing of a listing display of a possession characters.

Moreover, in the main menu screen 100, the number of acquiring items and the number of shared items are displayed in a display area 120 above the plurality of buttons 102-112. The acquiring item is an item required for acquiring a character. Moreover, the shared item is an item required for increasing the rarity of the possession character, and is usable in common to the possession characters.

If the button 102 is turned on (touched) in the main menu screen 100, after a field (stage) of the battle game to play is selected, the battle game of the selected field is started. A field of the battle game to be played may be selected by the player, or a computer (CPU 20) may select it.

In addition, it is determined whether the button 102 is touched based on whether a touch coordinate detected by the touch panel is within a displaying area of the button 102. Hereinafter, the same will be applied to a case of touching (on, selecting, instructing) buttons, icons or characters on the screen. However, when a cursor is moved by operating a push button or switch, the button, icon, or character on the screen may be turned on (selected, designated).

Figure 4:
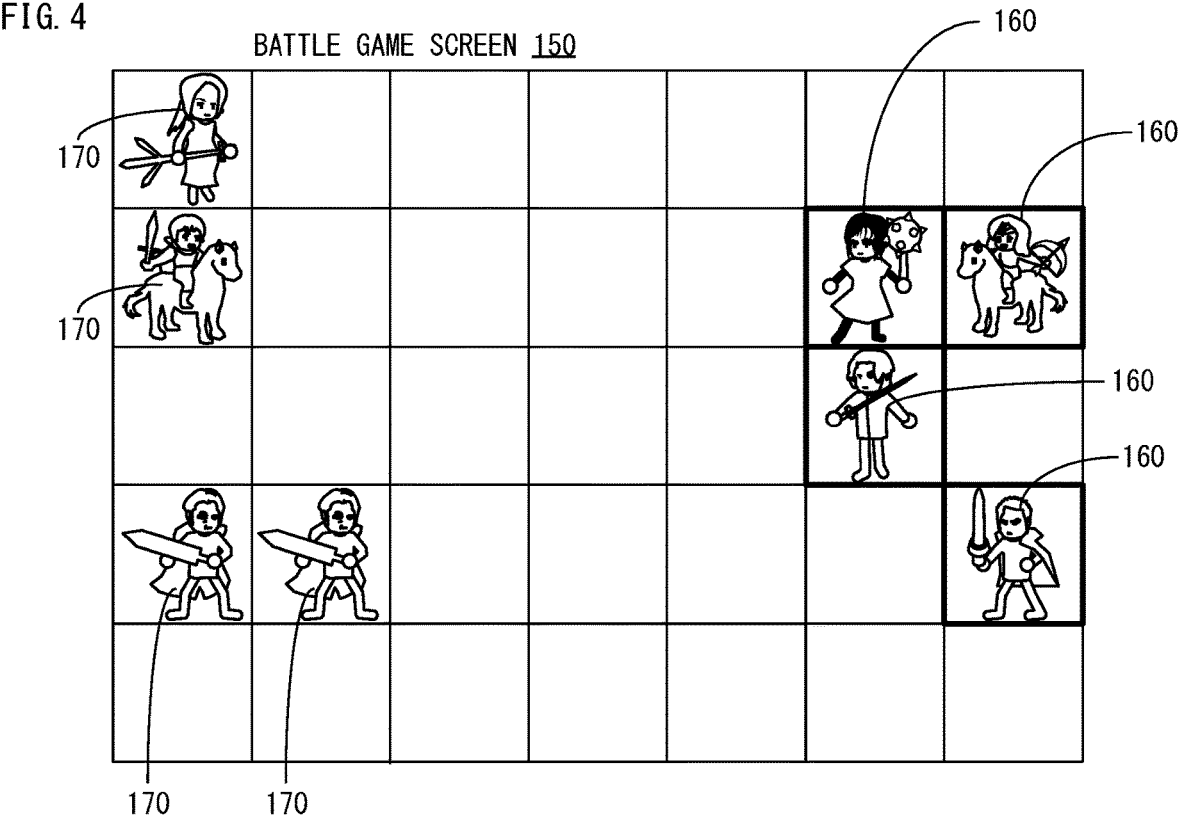
FIG. 4 is an illustration view showing a non-limiting example battle game screen to be displayed on the display shown in FIG. 2.

FIG. 4 is an illustration view showing a non-limiting example battle game screen 150 to be displayed on the display 36. The battle game screen 150 shown in FIG. 4 is a screen at a time the battle game is started (initial screen), in which a usage character(s) (player character) 160 of the first predetermined number (for example, four (4)), for example, an enemy character(s) 170 of the second predetermined number (for example, four (4)) are drawn on the game field. However, the first predetermined number and the second predetermined number may be not the same.

Moreover, the game field is divided in a grid pattern, and the usage character 160 and the enemy character 170 are movable per grid of square. However, the number of the grid squares that such a character is movable at once is set for each of the characters, and may be changed according to a level of the character, for example. Moreover, although illustration is omitted, the game field is composed of terrain objects, such as a ground (road), a mountain(s), a river(s), a forest(s), a valley(s), a bridge(s), a wall(s), a building(s), etc. Therefore, when there is a terrain object that becomes an obstacle or a terrain object that the character cannot walk, the usage character 160 and the enemy character 170 are moved on the game field by avoiding, destroying, or jumping such a terrain object.

In the battle game of this embodiment, an attack turn is repeated alternately between a side of the usage character 160 and a side of the enemy character 170. A physical strength value (HP) is set to each of the usage character 160 and the enemy character 170, and when the physical strength value is one (1) or more, it is in a state enable to fight. Moreover, if attacked, the physical strength value is reduced by the number according to the attack. If the physical strength value becomes zero (0) or less, each of the usage character 160 and the enemy character 170 will be in a state unable to fight, and will disappear from the game field. That is, the usage character 160 and the enemy character 170 of a state unable to fight are eliminated from the battle game screen 150.

When all the enemy characters 170 are brought into a state unable to fight and at least one usage character remains in the game field in a state enable to fight, the player wins the battle. Although illustration is omitted, at this time, screen expressing the player having won the battle (winning screen) is displayed on the display 36.

Moreover, a button for selecting playing a next battle game and a button for selecting ending the battle game are provided in the winning screen. If playing a next battle game is selected, a stage of the next battle game is selected to start the next battle game. On the other hand, if ending the battle game is selected, the battle game is ended, and the main menu screen 100 is displayed on the display 36.

Moreover, when all the usage characters 160 are brought into a state unable to fight and at least one enemy character 170 remains in the game field in a state enable to fight, a computer player (CPU 20) that controls the enemy character 170 wins the battle. Although illustration is omitted, at this case, a screen expressing the player having been lost the battle (losing screen) is displayed on the display 36.

In addition, although the computer player controls the enemy character 170 in this embodiment, the enemy character may be controlled by a human player. In such a case, a battle game is played by two players by two game apparatuses 16 communicating.

Moreover, a button for selecting re-playing a lost battle game and a button for selecting ending the battle game are provided in the losing screen. If re-playing the lost battle game is selected, the lost battle game is started from the beginning. On the other hand, if ending the battle game is selected, the battle game is ended, and the main menu screen 100 is displayed on the display 36.

Moreover, if the player wins the battle game, an experience value of the usage character 160 is increased (added). Moreover, if the player wins the battle game, a character value of the usage character 160 is increased (added). Furthermore, if the player wins the battle game, the acquiring item required for acquiring a character is given by the third predetermined number (for example, one (1)).

However, when the player wins the battle, the experience value and the character value are added to the usage character 160 that remains in the game field in a state enable to fight, and not added to the usage character 160 that is in a state unable to fight and disappeared from the game field.

A condition for adding the experience value and the character value does not need to be limited to this. For example, when winning the battle, the experience value and the character value may be added to the usage character even if having disappeared from the game field at the time of ending of the battle game. Moreover, the experience value is added each time the usage character 160 performs an attack etc. on the enemy character 170, and when winning the battle and remaining in the game field in a state enable to fight, an addition result is validated, otherwise the addition result is invalidated. However, a case where the addition result is invalidated means a case where the usage character being in a state unable to fight has been disappeared from the game field although winning the battle, or a case of losing the battle.

The experience value is an experience value of the attack in a battle game, and a value according to the usage character 160 having attacked the enemy character 170 is added. A level of the usage character 160 is determined according to this experience value. If the experience value is increased by the fourth predetermined number, a level is raised by one step. However, the fourth predetermined number is a number required to rise to a next level, and is increased as the level rises.

The character value is a variable (first parameter) associated with the usage character 160 (possession character), and is added according to that the player wins the battle. A value to be added is calculated with a formula that is determined (produced) for each of the usage characters 160 (possession characters) based on a predetermined rule. Therefore, the character value to be added may differ for each of the usage characters 160 (possession characters).

Although the formula is omitted, the predetermined rule is as follows: A first rule is that the higher the level of the enemy character 170 and the higher the rarity of the usage character 160, the larger the value to be added. A second rule is that the higher the level of the usage character 160, the larger the value to be added. A third rule is that the closer the level of the usage character 160 is to the level of the enemy character 170, the larger the value to be added.

A reason why providing the first and second rules is that when there are only weak usage characters 160 (possession characters), if the character values are added more, it is possible to immediately increase the rarity and thus a game balance will be destroyed. Moreover, a reason why providing the third rule is to prevent that the character value from being added largely by entirely (solely) knocking down the enemy character 170 weaker than the usage character 160.

In addition, the condition for adding the character value does not include that the usage character 160 attacks the enemy character 170. Therefore, only by participating in the battle game, regardless of whether the usage character 160 actually attacks enemy character 170, the character value is added when the usage character in a state enable to fight remains in the game field.

Moreover, the character value is a variable inherent to a character. Therefore, when there are a plurality of usage characters 160 (possession characters) having the same name, the character value is not associated with each usage character 160 (possession character), but the character value is associated in common with the plurality of usage characters 160 (possession characters) having the same name (same type). When the same type of usage characters 160 (possession characters) are regarded as a single group, it can be said that the character value is associated with this group. That is, one character value is associated with one type of possession character.

In addition, in this embodiment, the character value is associated with the same type of usage characters 160 (possession characters) as one group, but there is no need to limit the grouping method. For example, an attribute may be set for each character, and a group for each same attribute may be formed. As an example, it is possible to adopt the type of weapon (sword, ax and spear) as the attribute. Thus, a group is fixedly determined according to the type or attribute of the character, and cannot be change by the player.

Every time the fifth predetermined number (for example, 500) of character values are accumulated, the sixth predetermined number (for example, 500) of items (hereinafter, referred to as "shared item") for increasing the rarity of the possession character are added. That is, every time the character value exceeds a predetermined threshold value (500), the number of shared items is increased by the sixth predetermined number. More specifically, at each time point when the character value reaches 500, 1000, 1500, 2000, 2500 or 3000, the shared items of 500 are added. However, the fifth predetermined number and the sixth predetermined number may be not the same number. Moreover, an upper limit (for example, 3000) is set to the character value, and if the character value exceeds the upper limit when the character value is added, the character value is corrected to the upper limit. That is, if the character value reaches the upper limit, it is not increased beyond the upper limit.

Although every time that the character value is accumulated by the fifth predetermined number, the sixth number of shared items are automatically added in this embodiment, there is no need to be limited to this. The player may be notified that the fifth predetermined number of character values have been accumulated, and when the player confirms this, the sixth predetermined number may be added to the shared item. For example, the usage character 160 that the character value is accumulated by the fifth predetermined number is displayed in the main menu screen 100, and if this usage character 160 is designated (touched), the sixth predetermined number may be added to the shared item.

The shared item is used in order to increase the rarity of the possession character the player selects. However, the possession character that the rarity is to be increased does not need to be of the same type as the possession character that accumulates the character value in order to add the number (the second parameter) of the shared items. That is, it is possible to increase the rarity of an arbitrary (player desires) possession character.

As described later, the character is selected by lottery from all the characters, and the selected (acquired) character is acquired as the possession character. Therefore, not only a character the player desires but a character the player does not desire may be acquired. Moreover, there may be a case where the same type (name) two or more characters exist in the possession characters. In this case, the rarities of a plurality of characters of the same type may be the same or differ. However, even when the rarities differ, the plurality of characters are treated as the same type of characters.

In the virtual game of this embodiment, since the usage character 160 is selected from the possession characters, it is possible to select two or more characters of the same type as the usage character to play the battle game. In such a case, since the character value is given for each of the two or more usage characters 160 of the same type, in a battle game of one-time, the character value of the usage character 160 of such the type is increased more than a case where only one the usage character 160 is used.

Therefore, when a plurality of possession characters of the same type exist, even if the possession character is not a character the player desires, for example, by using these possession characters in the battle game as the usage characters, it is possible to acquire many character values for a short period of time, whereby many shared items can be acquired for a short period of time. Then, the rarity of the possession character the player desires can be increased for a short period of time by using the shared items. That is, even if it is a possession character the player does not desire, it becomes motivation to use the possession character in the battle game which improves the use of the possession characters.

Figure 5:
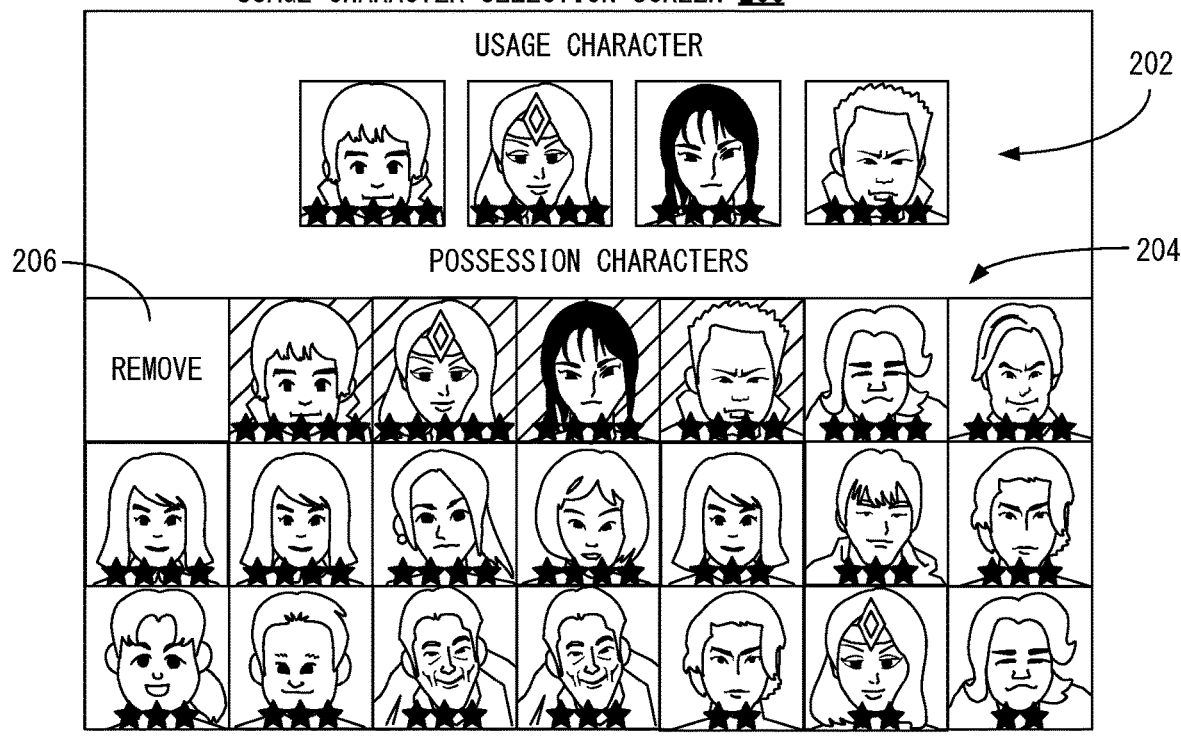
FIG. 5 is an illustration view showing a non-limiting example usage character selection screen to be displayed on the display shown in FIG. 2.

Moreover, if the button 104 is turned on in the main menu screen 100 shown in FIG. 3, selection processing of a usage character is started, and a usage character selection screen 200 as shown in FIG. 5 is displayed on the display 36.

As shown in FIG. 5, the usage character selection screen 200 is provided with a display area 202 that displays a usage character in an upper part of the screen, and below it, a display area 204 that displays a possession character and a button 206 for instructing to remove the usage character are provided.

Four (4) display frames are provided in the display area 202, and a face image of each of the usage characters 160 used in the battle game is displayed in each of the display frames. A plurality of display frames are provided in the display area 204, and a face image of each of the possession characters is displayed in each of the display frames. However, when the number of possession characters is smaller than the number of display frames, some display frames are blanked.

Moreover, in the usage character selection screen 200, slant lines are applied in the background of the face image of each of the possession characters that are selected as the usage characters 160. This is an example, there is no necessity of being limited, and the face image may be reversed in color or a mark image indicating of selection may be drawn on the face image in order to make realize that it can be seen that the possession character is selected as the usage character 160.

In addition, two or more characters having the same name may be included in the possession characters. In the usage character selection screen 200 shown in FIG. 5, the same type of possession characters are displayed to have the same face image. That is, the player can possess two or more characters of the same name.

Moreover, in the example shown in FIG. 5, a star image is drawn on the face image. This star image indicates the rarity of the possession character, and in this embodiment, the greater the number of stars, the higher the rarity. The face images of the possession characters are arranged in descending order of the rarity in the usage character selection screen 200 shown in FIG. 5.

In addition, although the rarity is expressed using the star image in this embodiment, this is an example, and the rarity may be expressed using numerals, alphabets, or both of them.

In this usage character selection screen 200, when wishing to change the usage character 160, the player selects (touches) the face image of the usage character 160 not to be used in the battle game, and selects the button 206. Then, the face image of the selected usage character 160 is erased from the display area 202, and the display frame in which the face image of this usage character 160 was displayed is made into a blank. Next, when the player selects the face image of the possession character wish to use for the battle game in the display area 204, this possession character is selected as the usage character 160, and the face image of the selected possession character (usage character 160) is drawn in the display frame being blanked of the display area 202, whereby this possession character is selected as the usage character 160.

In addition, the usage character 160 may be selected by selecting the face image of the usage character 160 and the face image of the possession character and by exchanging these characters directly.

The above-described selection method of the usage character 160 is a mere exemplification, and does not need to be limited, and suitably changeable.

Figure 6:
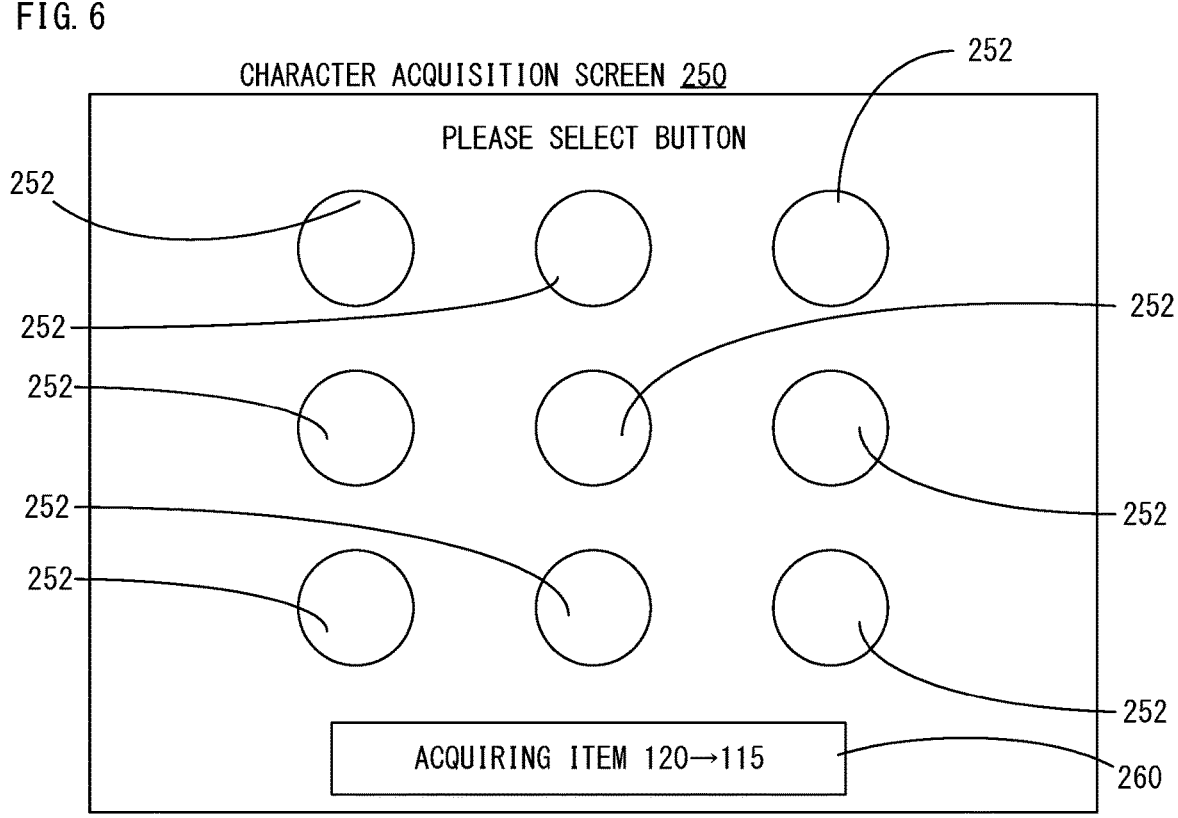
FIG. 6 is an illustration view showing a non-limiting example character acquisition screen to be displayed on the display shown in FIG. 2.

Moreover, if the button 106 is selected on the main menu screen 100 shown in FIG. 3, character acquisition processing is started, and a character acquisition screen 250 shown in FIG. 6 is displayed on the display 36.

As shown in FIG. 6, in the character acquisition screen 250, a plurality (in this embodiment, nine (9)) of the buttons 252 are drawn. A message for make the player select is displayed above the plurality of buttons 252. Below the plurality of buttons 252, there is a display area 260 for displaying the number of acquiring items before and after acquisition of a possession character.

In order to acquire a possession character, the seventh predetermined number (for example, five (9)) of the acquiring items are required, and when the number of the acquiring items is less than five (5), the button 252 cannot be selected. However, when the number of the acquiring items is less than five (5), the button 106 may be made not selectable in the main menu screen 100.

If the player selects a desired button 252 in the character acquisition screen 250, a character is acquired. At this time, a single character is selected out of all the characters by lottery, and the acquired (selected by lottery) character is stored as a possession character.

Here, all the characters mean all the characters that can appear in the virtual game, and characters having the same name and different rarities are included. Moreover, a character having been selected once may be selected again. The rarity is a probability of being selected by lottery from among all the characters, and the higher the rarity, the lower the probability of selection. For example, the rarity is set higher as the character is stronger (higher ability). That is, the higher the rank of strength, the higher the rarity is set. Therefore, the rarity is an example of a rank. Moreover, in this embodiment, the rarity is set in five (5) steps. When the character is strong, it can be said that a physical strength value at the start of battle is large, and a status such as offense power, speed, defense power, etc. is high. Therefore, when the rarities of the characters of the same type and having the same level differ, the character with the higher rarity is stronger in the battle game. Therefore, the higher the rarity of the character is, the more advantageously the game can advance. However, when the rarities are the same, the character with the higher level is stronger in the battle game.

Moreover, as described later, when the rarity of the possession character is increased, the level of the possession character is reset to the lowest level and thus temporarily weakened in the battle game; however, as described above, since the higher the rarity, the larger the physical strength value and the higher the status, it is possible to proceed the game more advantageously than when using the possession character having the low rarity.

Figure 7:
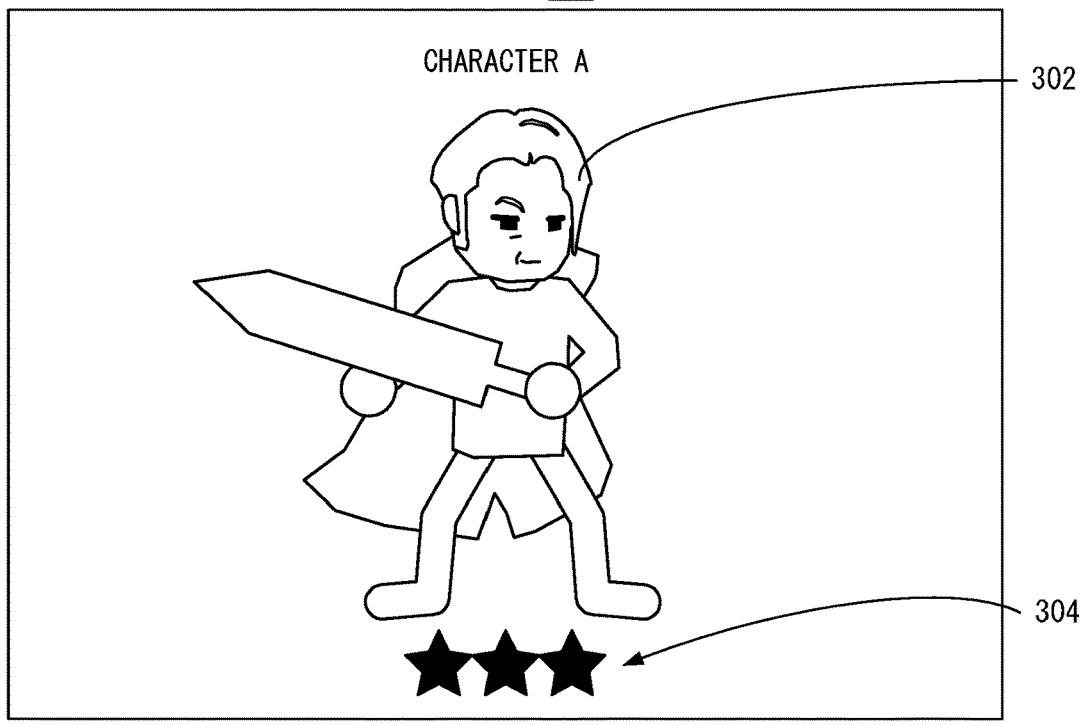
FIG. 7 is an illustration view showing a non-limiting example acquisition result screen to be displayed on the display shown in FIG. 2.

FIG. 7 shows a non-limiting example screen (acquisition result screen) 300 that indicates a result of acquisition of the character by selecting the button 252 in the character acquisition screen 250 shown in FIG. 6.

As shown in FIG. 7, a whole body image 302 of the possession character acquired is drawn in the middle of the screen in the acquisition result screen 300. Moreover, below the whole body image 302, a star image 304 indicative of the rarity is drawn. Here, since the image 304 of three stars is drawn, it can be seen that the rarity of the acquired character is "3". Furthermore, above the whole body image 302, a character name (in FIG. 7, "character A") of the acquired character is drawn.

If a character is acquired, the character acquisition screen 250 shown in FIG. 6 is displayed, and the character acquisition processing will be continued. Therefore, it is possible to acquire a character continuously.

Figure 8:
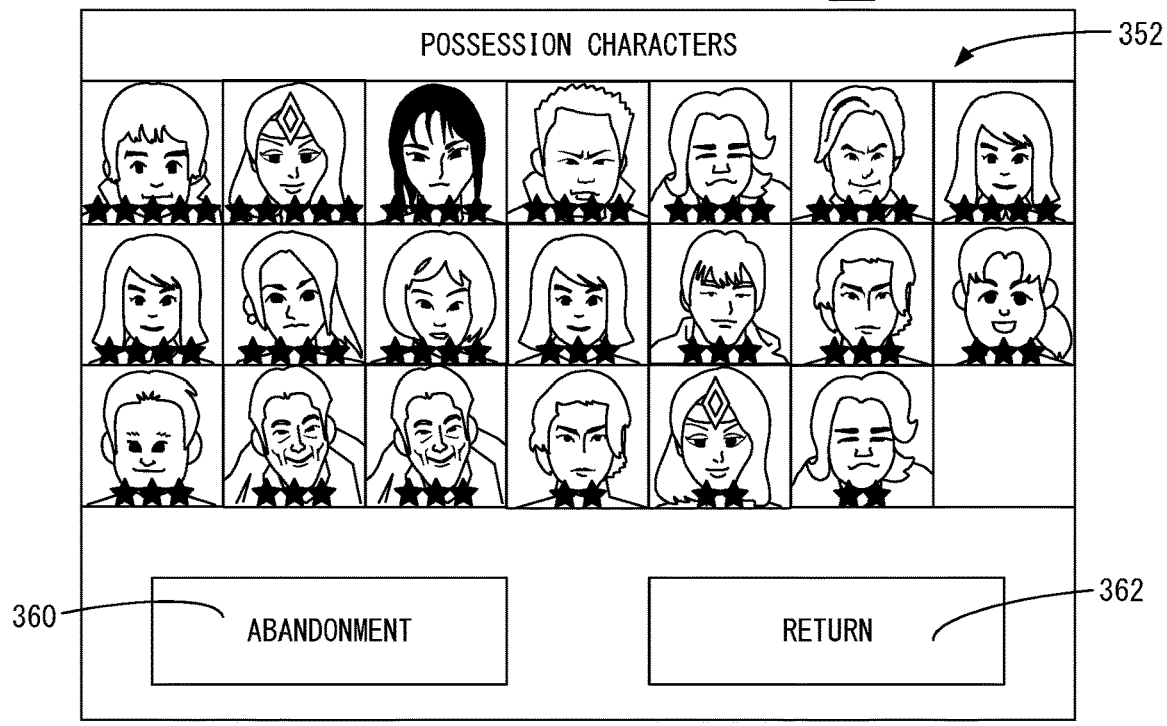
FIG. 8 is an illustration view showing a non-limiting example possession character abandonment screen to be displayed on the display shown in FIG. 2.

Moreover, if the button 108 is selected on the main menu screen 100 shown in FIG. 3, processing of possession character abandonment is started and a possession character abandonment screen 350 as shown in FIG. 8 will be displayed on the display 36.

As shown in FIG. 8, a display area 352 is provided in the possession character abandonment screen 350, and a plurality of display frames are formed in this display area 352, and a face image of each of the possession characters is displayed in each display frame. Moreover, a button 360 and a button 362 are provided below the display area 352. The button 360 is provided in order to perform the abandonment processing of the possession character the player selects. The button 362 is provided in order to end the possession character abandonment processing, and to display the main menu screen 100 on the display 36.

In this possession character abandonment screen 350, if the button 360 is selected while the player selects the face image of the possession character displayed on the display area 352, owning the possession character corresponding to the selected face image is abandoned (released). If the owning the possession character is abandoned, data of the possession character is erased from the possession character data 510. At this time, the number of shared items set according to the rarity of the possession character that the owning has been abandoned is added. Thus, it is also possible to acquire the shared item by abandoning the owning the possession character.

Figures 9, 10:
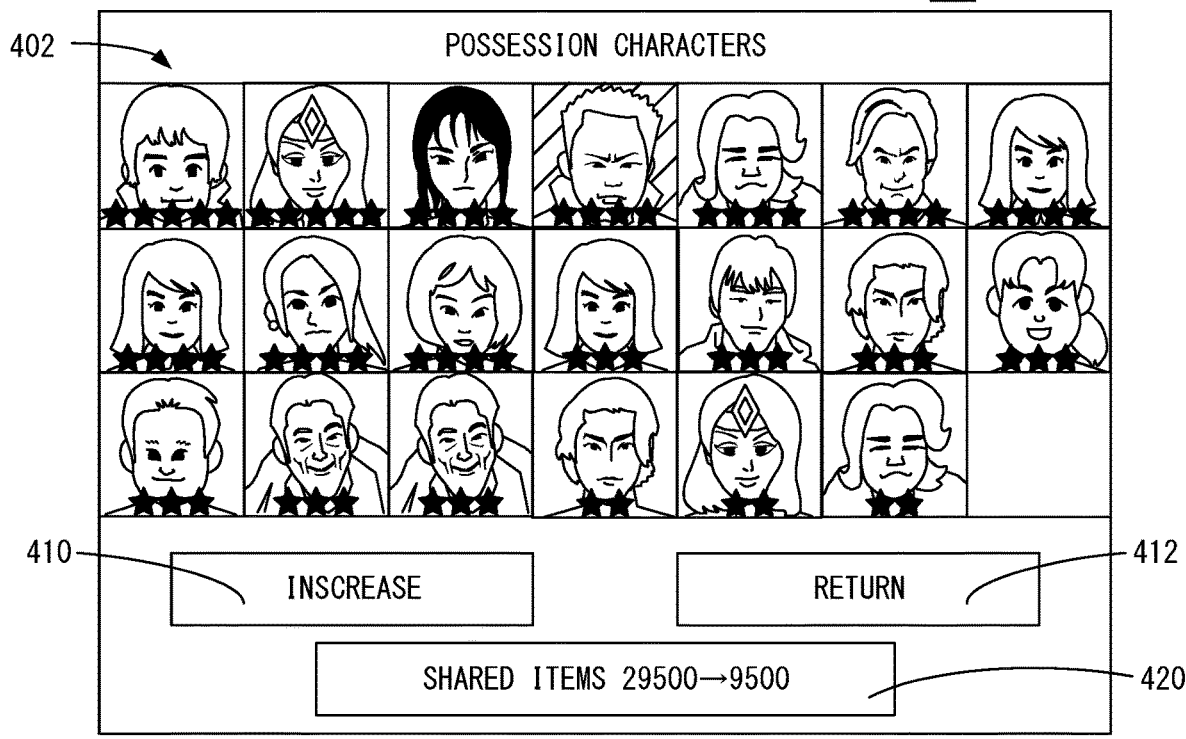
FIG. 9 is an illustration view showing a non-limiting example possession character rarity increase screen to be displayed on the display shown in FIG. 2.
FIG. 10 is an illustration view showing a non-limiting example character value listing display screen to be displayed on the display shown in FIG. 2.

Moreover, if the button 110 is selected in the main menu screen 100 shown in FIG. 3, processing of a possession character rarity increase is started and a possession character rarity increase screen 400 as shown in FIG. 9 will be displayed on the display 36.

As shown in FIG. 9, a display area 402 that displays the face image of the possession character is provided in the possession character rarity increase screen 400, and a plurality of display frames are provided in this display area 402, and the face image of each of the possession characters is displayed in each display frame. Moreover, a button 410 and a button 412 are provided below the display area 402. The button 410 is provided in order to perform rarity increase processing of the possession character the player selects. The button 412 is provided in order to end the possession character rarity increase processing, and to display the main menu screen 100 on the display 36. Furthermore, below the button 410 and the button 412, there is provided with a display area 420 for displaying the number of shared items before and after increase of the rarity.

In this possession character rarity increase screen 400, if the face image of the possession character displayed in the display area 402 is selected by the player, and the button 410 is selected in a state where the face image is being selected, the rarity of the possession character corresponding to the selected face image is increased by one (1) step. At this time, the shared item is reduced (consumed) by the eighth predetermined number.

In this embodiment, 20-pieces of the shared items are required to increase the rarity from "1" to "2", 200-pieces of the shared items are required to increase the rarity from "2" to "3", 2000-pieces of the shared items are required to increase the rarity from "3" to "4", and 20000-pieces of the shared items are required to increase the rarity from "4" to "5".

In the possession character rarity increase screen 400 shown in FIG. 9, the face image displayed in the upper most center of the display area 402 is selected, and in this case, the rarity of the possession character corresponding to the selected face image is increased from "4" to "5". As above-described, the number of the shared items before and after increase the rarity is displayed in the display area 420, the player is notified that 20000-pieces of the shared items are consumed (reduced) when the rarity of the possession character is to be increased from "4" to "5".

Thus, it is possible to increase the rarity of a desired possession character by using the shared item that is given according to the character value acquired in the battle game. Therefore, the possession character that the rarity can be increased is not limited to the usage character 160 that acquires the character value.

In addition, although a detailed description is omitted, the character value may be given by a method except winning a battle game. For example, the character value may be distributed by an operator of the server 12 or a supplier of the application of this virtual game.

Moreover, if the button 112 is selected on the main menu screen 100 shown in FIG. 3, processing of listing display of the character values is performed, and a character value listing display screen 450 as shown in FIG. 10 will be displayed on the display 36.

As shown in FIG. 10, in the character value listing display screen 450, the face images of the possession characters and the character values corresponding to these possession characters are displayed in descending order of character values (descending order). Moreover, about the possession character that the character value has reached the upper limit (3000), an expression different from that of the possession character that the character value has not reached the upper limit is applied, whereby the player is notified (distinguished) that fact. For example, the background color of the face image of the possession character that the character value has reached the upper limit is changed, or the display frame of the face image is displayed in different color. In FIG. 10, it is indicated by applying slant lines that the background color of the face image of the possession character that the character value has reached the upper limit is changed.

Moreover, as described above, since the character value is a value inherent to a character and the character value is associated in common with a plurality of possession characters of the same type, the face images of the possession characters of the same type (name) will not be displayed redundantly in the character value listing display screen 450. Therefore, even in a case where two or more possession characters of the same type exist and those rarities differ, the face images of the possession characters are collected into one to be displayed.

By displaying the character value listing display screen 450 shown in FIG. 10 on the display 36, it is possible for the player to know at a single glance the possession character with high or low frequency of use for battle game, or not used in the battle game. Moreover, since the character value for each possession character can be known, it is possible to confirm a progress situation of the game by taking into consideration the upper limit (in this embodiment, 3000) of the character value.

Figure 11:
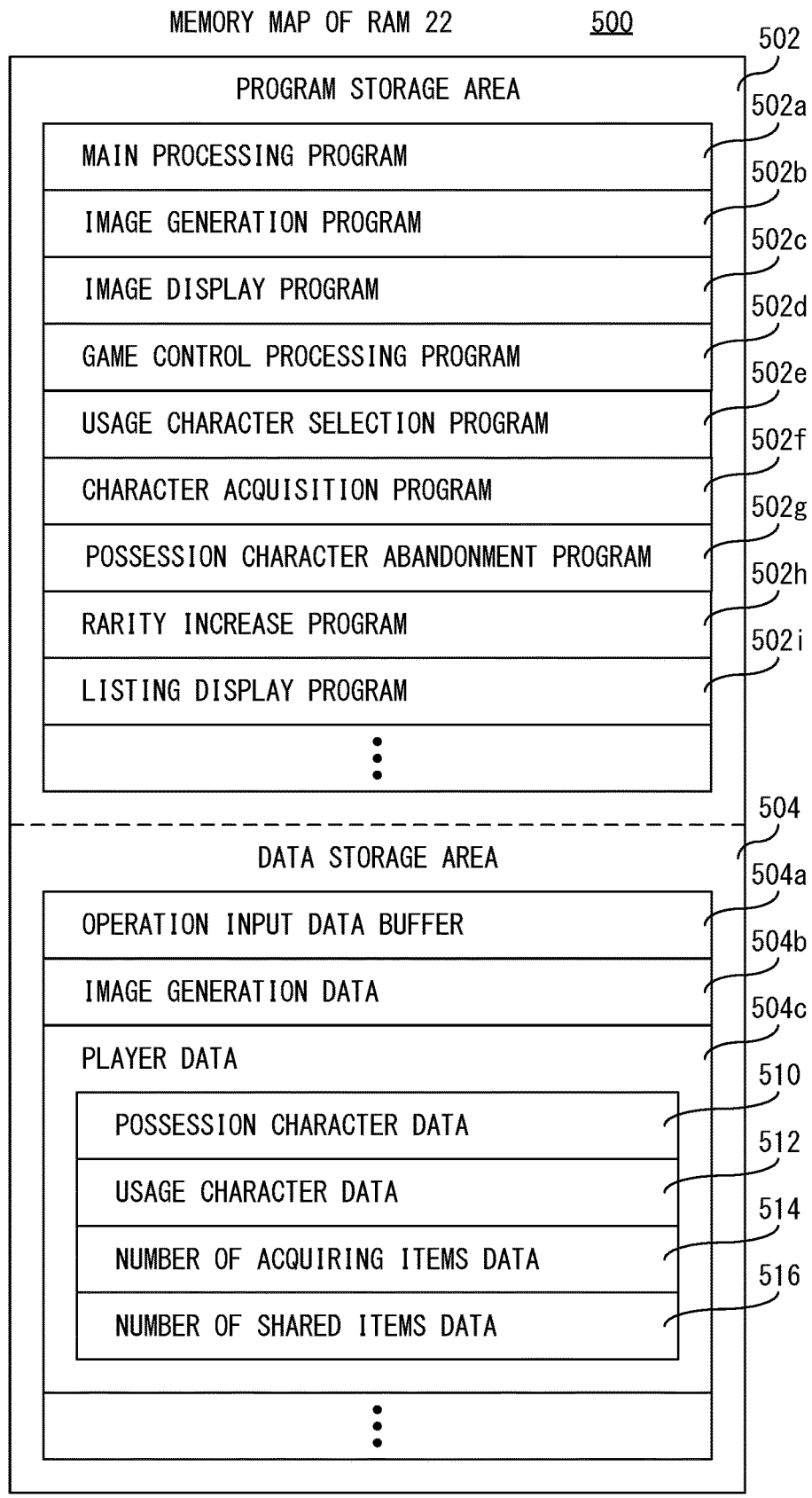
FIG. 11 is an illustration view showing a non-limiting example memory map of a RAM incorporated in the game apparatus shown in FIG. 2.

FIG. 11 is an illustration view showing a non-limiting example memory map 500 of the RAM 22 of the game apparatus 16 shown in FIG. 2. As shown in FIG. 11, the RAM 22 includes a program storage area 502 and a data storage area 504. The program storage area 502 is stored with an information processing program such as an application program of the game of this embodiment, and the information processing program includes a main processing program 502*a*, an image generation program 502*b*, an image display program 502*c*, a game control processing program 502*d*, a usage character selection program 502*e*, a character acquisition program 502*f*, a possession character abandonment program 502*g*, a rarity increase program 502*h*, a listing display program 502*i*, etc.

The main processing program 502*a* is a program for executing processing of a main routine of the game application (overall game processing) of this embodiment. The image generation program 502*b* is a program for generating image data of game images (above-described various kinds of screens 100, 150, 200, 250, 300, 350, 400, 450, etc.) (game image data) by using image generation data 504*b*, and by referring to player data 504*c* as necessary.

The image display program 502*c* is a program for outputting the game image data generated according to the image generation program 502*b* to the display 36. Therefore, the game image corresponding to the game image data is displayed on the display 36.

The game control processing program 502*d* is a program for performing game control processing of the battle game in the overall game processing. The usage character selection program 502*e* is a program for selecting (determining) the usage character 160 to be used in the battle game according to operations of the player. The character acquisition program 502*f* is a program for acquiring a character from all the characters.

The possession character abandonment program 502*g* is a program for abandoning (releasing) owning the possession character selected according to operations of the player. The rarity increase program 502*h* is a program for increasing the rarity of the possession character selected according to operations of the player. The listing display program 502*i* is a program for listing-displaying the possession characters and the character values corresponding to those by listing according to operations of the player.

Although illustration is omitted, the program storage area 502 is stored with other programs such as a communication program for performing communication with the server 12 and other game apparatuses, a program for saving (storing) the player data 504*c* (game data) in the flash memory 24, a sound output program for generating and outputting a sound required for the game, etc.

The data storage area 504 is provided with an operation input data buffer 504*a*. Moreover, the data storage area 504 is stored with data such as the image generation data 504*b*, the player data 504*c*, etc.

The operation input data buffer 504*a* is an area for temporarily storing operation data from the input device 50. When received by the CPU 20, the operation data is stored in the operation input data buffer 504*a* according to a time series, and if used for the processing of the CPU 20, it will be erased.

The image generation data 504*b* includes data of polygon data, texture data, character image data, etc. for generating the game image data. However, the character image data is data for various kinds of characters or objects that are arranged and appear in a virtual space.

The player data 504*c* is data (game data) about the player of the virtual game of this embodiment, and includes possession character data 510, usage character data 512, acquiring item number data 514 and shared item number data 516.

Figure 12:
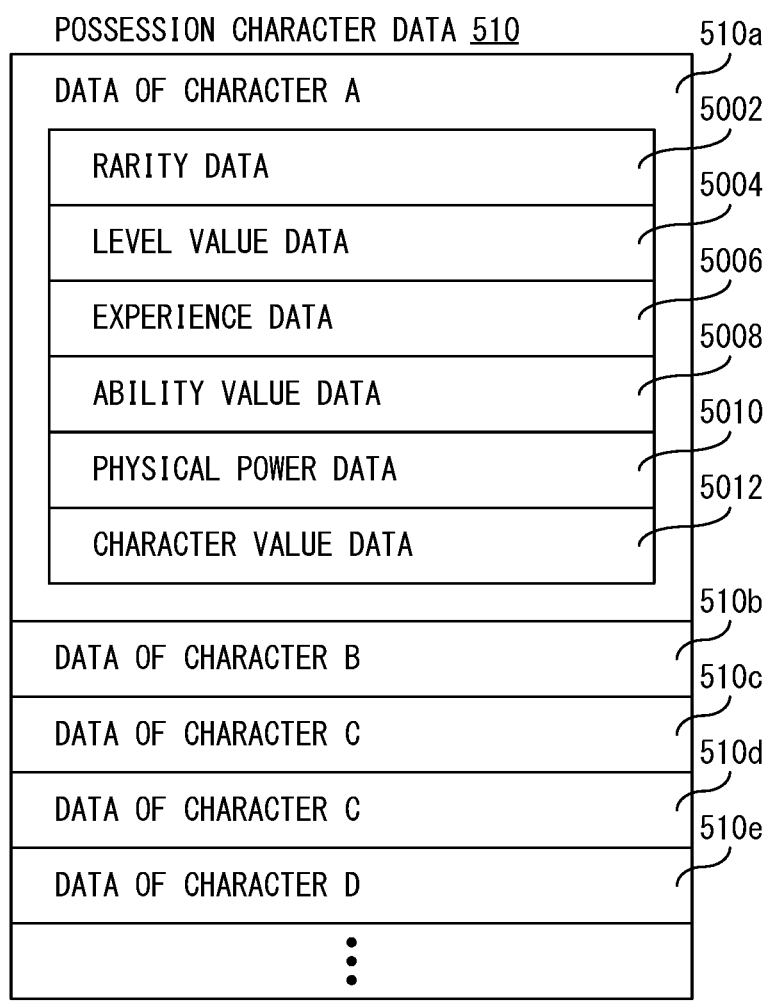
FIG. 12 is an illustration view showing specific content of possession character data shown in FIG. 11.

The possession character data 510 is data about all the characters the player owns. As shown in FIG. 12, the possession character data 510 includes character A data 510*a*, character B data 510*b*, character C data 510*c*, character C data 510*d*, character D data 510*e*, and so on.

The character A data 510*a* is data about the character A, and includes rarity data 5002, level value data 5004, experience value data 5006, ability value data 5008, physical strength value data 5010 and character value data 5012.

The rarity data 5002 is numeral value data indicating a stage (numeral value) of the rarity of the character A (character name). The level value data 5004 is numeral value data indicating a numeral value of the level of the character A. The experience value data 5006 is numeral value data indicating an experience value cumulatively acquired at a current level.

The ability value data 5008 is a numeral value data about various abilities of the character A. The various kinds of abilities includes an offense power, a defense power, a speed, etc. equipped by the character A, and height of these abilities are expressed by numeral values.

The physical strength value data 5010 is numeral value data about an entire physical strength of the character A at the current level. The character value data 5012 is numeral value data indicating the character value cumulatively acquired for the character A.

Although illustration and description are omitted, the same is applied to other character B data 510*b*, character C data 510*c*, character C data 510*d*, character D data 510*e*, and so on.

However, the character C data 510*c* and the character C data 510*d* are all data about the character C (character name), and except for the character value data 5012, the rarity data 5002, the level value data 5004, the experience value data 5006, the ability value data 5008 and the physical strength value data 5010 are stored (updated) for each character C. However, since the character value is an inherent value for the character, the character value data 5012 are common parameter data for the possession characters of the same type (character name). Therefore, the common character value data 5012 is described in the character C data 510*c* and the character C data 510*d*.

Returning to FIG. 11, the usage character data 512 is a copy of the data of the possession character that is selected (determined) to be used in the battle game according to the usage character selection program 502*e*. Since four (4) usage characters 160 are selected in this embodiment, the usage character data 512 includes data for the four (4) usage characters, and the content of the data of each of the usage characters 160 is the same as that of each character in FIG.

12. However, instead of copying the data of the possession character, the data of the possession character may be simply referred to.

The acquiring item number data 514 is numeral value data about the number of acquiring items the player acquires. The shared item number data 516 is numeral value data about the number of shared items the player acquires.

Although illustration is omitted, the data storage area 504 is stored with other data, and provided with a flag(s) and other counter(s) (timer(s)) required for the overall game processing (information processing).

FIG. 13-FIG. 20 are flow charts of the overall game processing of the CPU 20 shown in FIG. 2. For example, this overall game processing is started according to the user has instructed to execute the program of the game application that is an example of the information processing.

Figure 13:
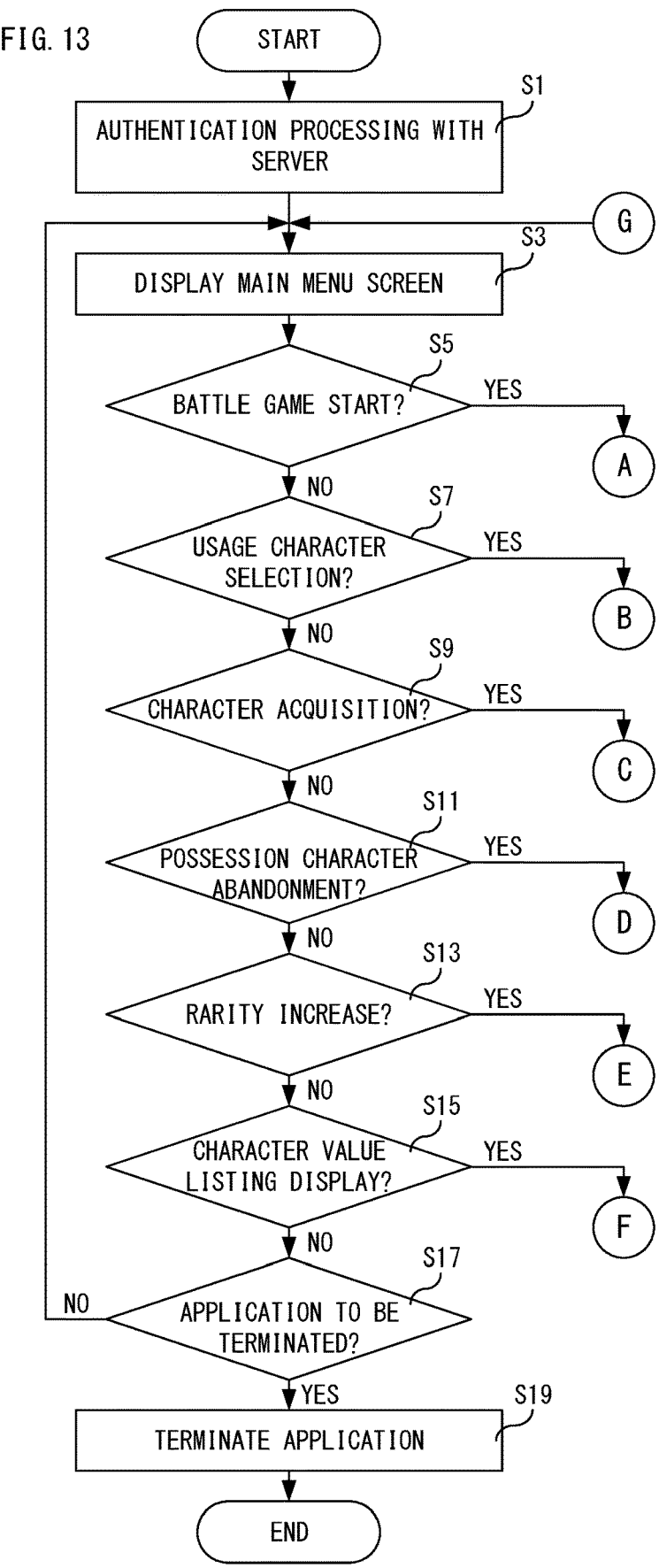
FIG. 13 is a flow chart showing a first part of a non-limiting example overall game processing of a CPU incorporated in the game apparatus shown in FIG. 2.

As shown in FIG. 13, if the overall game processing is started, the CPU 20 performs in a step S1 authentication processing with the server 12. Here, the CPU 20 communicably connects the first communication module 26 to the server 12 via the network 14, and transmits information of the game apparatus 16 or the player and the player data 504c to the server 12.

When receiving the information of the game apparatus 16 or the player and the player data 504c, the server 12 reads the player data to be managed corresponding to the information of the game apparatus 16 or the player, and confirms whether the received player data 504c corresponds to the read player data.

When the received player data 504c and the read player data are in agreement, the authentication is successful, and this is transmitted to the game apparatus 16 and the game is continued. On the other hand, when the received player data 504c and the read player data are not in agreement, there is a possibility that the player data 504c (game data) is altered, and therefore, the authentication is not successful, and this is transmitted to the game apparatus 16. Although illustration is omitted, when the authentication is not successful, the overall game processing is forcedly terminated.

In a next step S3, the main menu screen 100 as shown in FIG. 3 is displayed on the display 36. Subsequently, it is determined in a step S5 whether a start of a battle game. Here, the CPU 20 determines whether the button 102 is turned on in the main menu screen 100, and further determines whether a field of the battle game to play is selected.

If "YES" is determined in the step S5, that is, if the battle game is to be started, the process proceeds to a step S21 of FIG. 14 to be described later. On the other hand, if "NO" is determined in the step S5, that is, if the battle game is not to be started, it is determined in a step S7 whether it is usage character selection. Here, the CPU 20 determines whether the button 104 is turned on in the main menu screen 100.

If "YES" is determined in the step S7, that is, if it is the usage character selection, the process proceeds to a step S59 of FIG. 16 to be described later. On the other hand, if "NO" is determined in the step S7, that is, if it is not the usage character selection, it is determined in a step S9 whether it is character acquisition. Here, the CPU 20 determines whether the button 106 is turned on in the main menu screen 100.

If "YES" is determined in the step S9, that is, if it is the character acquisition, the process proceeds to a step S69 of FIG. 17 to be described later. On the other hand, if "NO" is determined in the step S9, that is, if it is not the character acquisition, it is determined in a step S11 whether it is possession character abandonment. Here, the CPU 20 determines whether the button 108 is turned on in the main menu screen 100.

If "YES" is determined in the step S11, that is, if it is the possession character abandonment, the process proceeds to a step S85 of FIG. 18 to be described later. On the other hand, if "NO" is determined in the step S11, that is, if it is not the possession character abandonment, it is determined in a step S13 whether it is rarity increase. Here, the CPU 20 determines whether the button 110 is turned on in the main menu screen 100.

If "YES" is determined in the step S13, that is, if it is the rarity increase, the process proceeds to a step S97 of FIG. 19 to be described later. On the other hand, if "NO" is determined in the step S13, that is, if it is not the rarity increase, it is determined in a step S15 whether it is character value listing display. Here, the CPU 20 determines whether the button 112 is turned on in the main menu screen 100.

If "YES" is determined in the step S15, that is, if it is the character value listing display, the process proceeds to a step S109 of FIG. 20 to be described later. On the other hand, if "NO" is determined in the step S15, that is, if it is not the character value listing display, it is determined in a step S17 whether it is an end of the application based on an input from the input device 30. Here, the CPU 20 determines whether an end of the application is instructed by the player.

If "NO" is determined in the step S17, that is, if it is not an end of the application, the process returns to the step S3. On the other hand, if "YES" is determined in the step S17, that is, if it is an end of the application, the application is ended in a step S19 to terminate the overall game processing.

Figure 14:
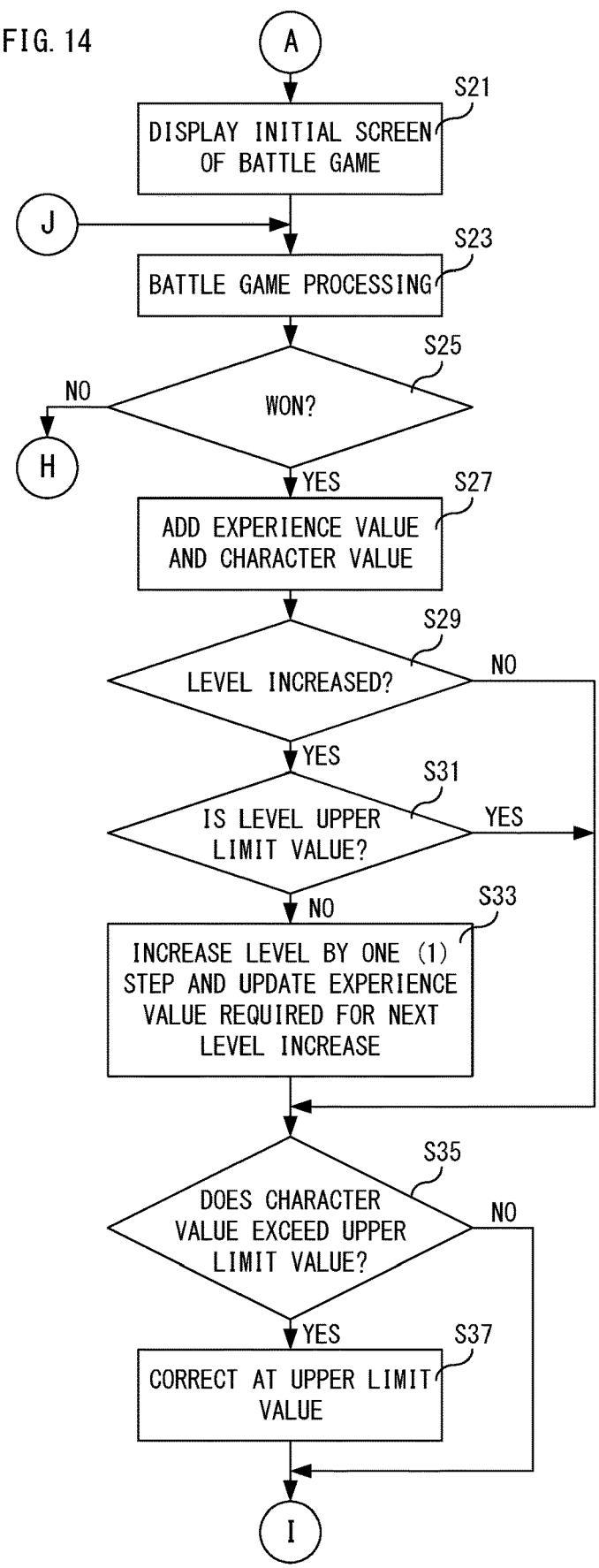
FIG. 14 is a flow chart showing a second part of the non-limiting example overall game processing of the CPU incorporated in the game apparatus shown in FIG. 2, following FIG. 13.

As described above, if "YES" is determined in the step S5, battle game processing is started, and as shown in FIG. 14, an initial screen of the battle game is displayed on the display 36 in the step S21. Here, the initial screen of a battle game screen 150 as shown in FIG. 4 is displayed on the display 36. In addition, although detailed description is omitted, when a field or stage of the battle game that the player plays is selected, the initial screen of the battle game screen 150 of the field or stage being selected is displayed on the display 36.

In a next step S23, the battle game processing is performed according to the input of the player, etc. As described above, in an attack turn of the player, instructions of a movement of each usage character or/and an attack on an enemy character are input by the player, and the battle game processing in accordance with the instructions is performed. When the attack turn of the player is ended, it becomes an attack turn of a computer player. Instructions of a movement of each enemy character 170 or/and an attack on the usage character are input by the computer player, and the battle game processing according to the instructions is performed. When the attack turn of the computer player is ended, it becomes an attack turn of the player. However, the CPU 20 proceeds to a next step S25 every time that one (1) usage character 160 (or enemy character 170) is made to perform movement or/and attack processing in the step S23, and all the usage characters 160 (or enemy characters 170) are made to perform movement or/and attack processing, an attack turn will move to another side.

In the step S25, it is determined whether the player won the battle game. That is, the CPU 20 determines whether all the enemy characters 170 are in a state where it is unable to fight. If "YES" is determined in the step S25, that is, if the player wins the battle game, in a step S27, the experience value data 5006 and the character value data 5012 are updated by adding the experience value and the character value. However, the experience value and the character value are added to all the usage characters 160 remaining in the game field in a state enable to fight when winning the battle game. Moreover, as described above, in a case where the experience value is added every time that the usage character 160 attacks on the enemy character 170, when winning the battle game and remaining in the game field in a state enable to fight, an addition result is validated, otherwise the addition result is invalidated to be restored to the experience value before the battle game.

In addition, although illustration is omitted, when the level is the upper limit value (for example, 40), if the experience value is added up to a maximum value, thereafter, the experience value will not be added (updated).

Moreover, processing in steps S29-S37 to be described later is performed for each of all the usage characters 160 remaining in the game field when winning the battle game.

In the next step S29, it is determined whether it is level increase. Here, the CPU 20 determines whether the experience value is more than an experience value (the fourth predetermined number) required for level increase. If "NO" is determined in the step S29, that is, if it is not the level increase, the process proceeds to a step S35. On the other hand, if "YES" is determined in the step S29, that is, if it is the level increase, it is determined in a step S31 whether the level is the upper limit.

If "YES" is determined in the step S31, that is, if the level is the upper limit value, the process proceeds to the step S35. On the other hand, if "NO" is determined in the step S31, that is, if the level is less than the upper limit value, the level is increased by one step and the experience value required for next level increase is updated (increased) in a step S33, and the process proceeds to the step S35.

In addition, although in this embodiment, the experience value is added up to the fourth predetermined number even when the level becomes the upper limit, the experience value may not be added when the level becomes the upper limit value.

In the step S35, it is determined whether the character value exceeds the upper limit value (for example, 3000). If "NO" is determined in the step S35, that is, if the character value does not exceed the upper limit, the process proceeds to a step S39 shown in FIG. 15. On the other hand, if "YES" is determined in the step S35, that is, if the character value exceeds the upper limit, the character value is corrected to the upper limit value in the step S37, and the process proceeds to the step S39.

Figure 15:
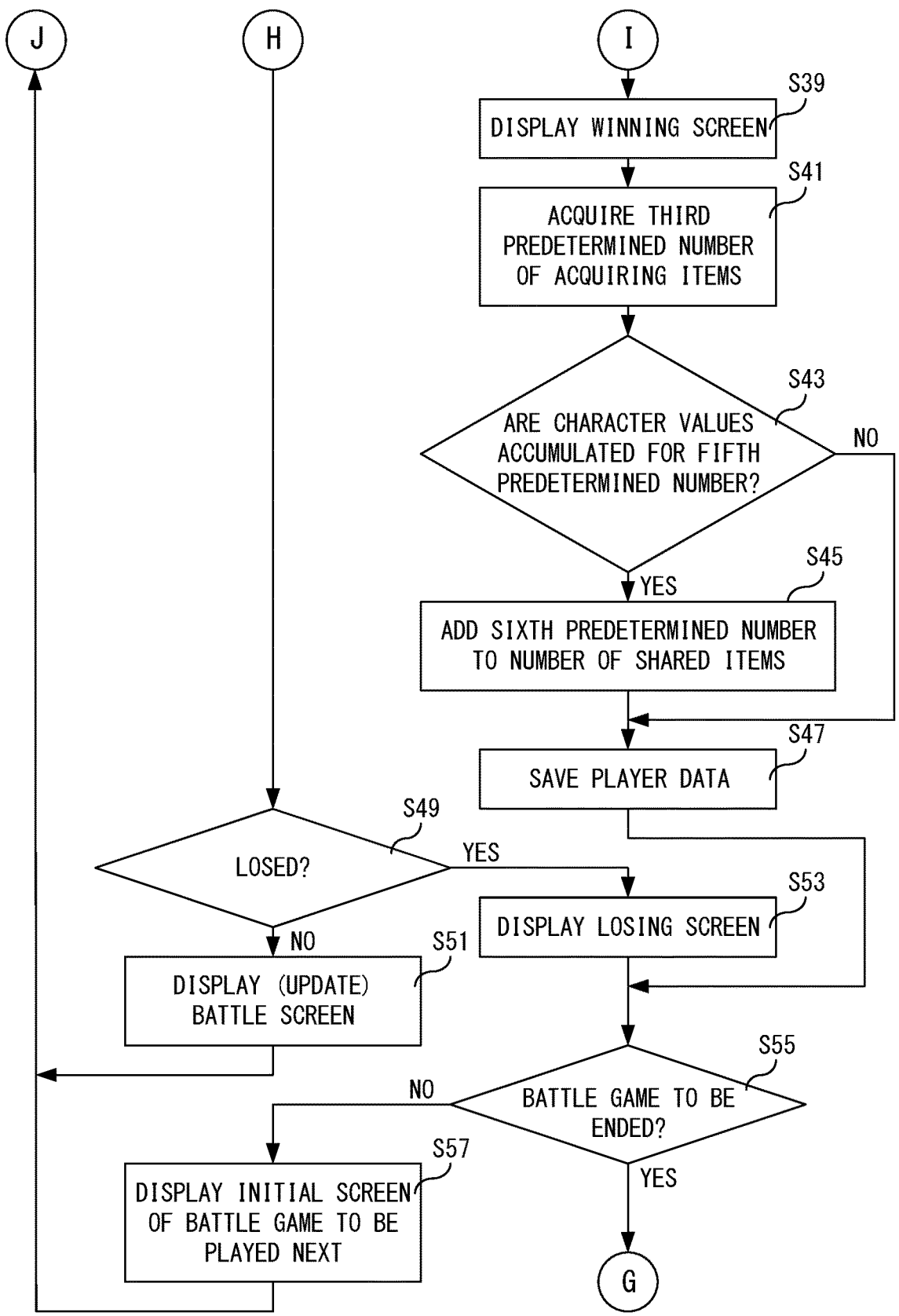
FIG. 15 is a flow chart showing a third part of the non-limiting example overall game processing of the CPU incorporated in the game apparatus shown in FIG. 2, following FIG. 14.

In the step S39 shown in FIG. 15, a winning screen is displayed on the display 36, and the acquiring item is acquired by the third predetermined number (for example, one (1)) in a step S41. Here, the CPU 20 updates the acquiring item number data 514 by adding the number of acquiring items acquired this time.

Subsequently, in a step S43, it is determined whether the character value is accumulated by the fifth predetermined number (for example, 500). If "NO" is determined in the step S43, that is, if the character value is not accumulated by the fifth predetermined number, the process proceeds to a step S47. On the other hand, if "YES" is determined in the step S43, that is, if the character value is accumulated by the fifth predetermined number, the sixth predetermined number (for example, 500) is added to the shared item number in a step S45, and then, the process proceeds to the step S47. In this step S45, the CPU 20 increases the number of the shared items indicated by the shared item number data 516 by the sixth predetermined number to update the shared item number data 516. In the step S47, the player data 504c is saved, the process proceeds to a step S55. In the step S47, the CPU 20 saves the player data 504c in the flash memory 24, and transmits the same to the server 12. Therefore, the server 12 updates the player data 504c corresponding to either the game apparatus 16 or the information of the player. Hereinafter, a case of saving the player data 504c is the same, so duplicate description is omitted.

In addition, as described above, the shared item may be added with the sixth predetermined number when the player is notified that the character value is accumulated by the fifth predetermined number and the player confirms this. In this case, for example, the step S43 is performed between the step S1 and the step S3. Moreover, a step (determination step) that determines whether the player confirms that the character value is accumulated by the fifth predetermined number is performed between the step S3 and the step S5, and if it is determined that the player does not confirm it, this determination step is repeatedly performed, and then, if it is determined that the player confirms, the processing in the step S45 and the processing for saving the player data 504c are performed.

Specifically, the CPU 20 performs the step S43 following the step S1, and if "NO" is determined in the step S43, the main menu screen 100 shown in FIG. 3 is displayed in the step S3. On the other hand, if "YES" is determined in the step S43, in the step S3, the main menu screen 100 in which the usage character 160 to which the character value is accumulated by the fifth predetermined number appears (be drawn) is displayed. For example, the usage character 160 that the character value is accumulated by the fifth predetermined number is further drawn between the buttons 102-106 and the buttons 108-112 in the main menu screen 100 shown in FIG. 3.

In the main menu screen 100, if the usage character 160 is not selected (touched), "NO" is determined in the determination step, and the process returns to the same determination step. In contrast, if the usage character 160 is selected (touched), "YES" is determined in the determination step, and the sixth predetermined number is added to the number of the shared items in the step S45, thereby to save the player data 504c, and then, the process returns to the step S3 to display the main menu screen 100 shown in FIG. 3.

Returning to FIG. 14, if "NO" is determined in the step S25, that is, if the player does not win, it is determined, in a step S49, whether the player loses the battle game. Here, the CPU 20 determines whether all the usage characters 160 are in a state unable to fight.

If "NO" is determined in the step S49, that is, if the player does not lose the battle game, the battle game screen 150 is displayed (updated) on the display 36 in a step S51, and the process returns to the step S23 shown in FIG. 14. During the battle game, sounds necessary for the game such as voices of the usage character 160 and enemy character, BGM and effect sound are also output.

If "YES" is determined in the step S49, that is, if the player loses the battle game, a losing screen is displayed in a step S53, and the process proceeds to the step S55. In the step S55, it is determined whether the battle game is to be ended. Here, the CPU 20 determines whether the player instructs (selects) to end the battle game in the winning screen or the losing screen.

If "NO" is determined in the step S55, that is, if the battle game is not to be ended, in a step S57, an initial screen of a battle game that is played next on the display 36, and the process returns to the step S23.

However, when selecting to play the battle game of a further field, in the step S57, an initial screen of the field of the battle game screen 150 the player selects is displayed on the display 36. On the other hand, when a replay is selected in the losing screen, in the step S57, an initial screen of the battle game screen 150 played previously is displayed on the display 36.

Moreover, if "YES" is determined in the step S55, that is, if the battle game is to be ended, the process returns to step S3 shown in FIG. 3. Therefore, the battle game processing is ended, and instead of the battle game screen 150, the main menu screen 100 is displayed on the display 36. Hereinafter, the same is true when the process returns to the step S3.

Figure 16:
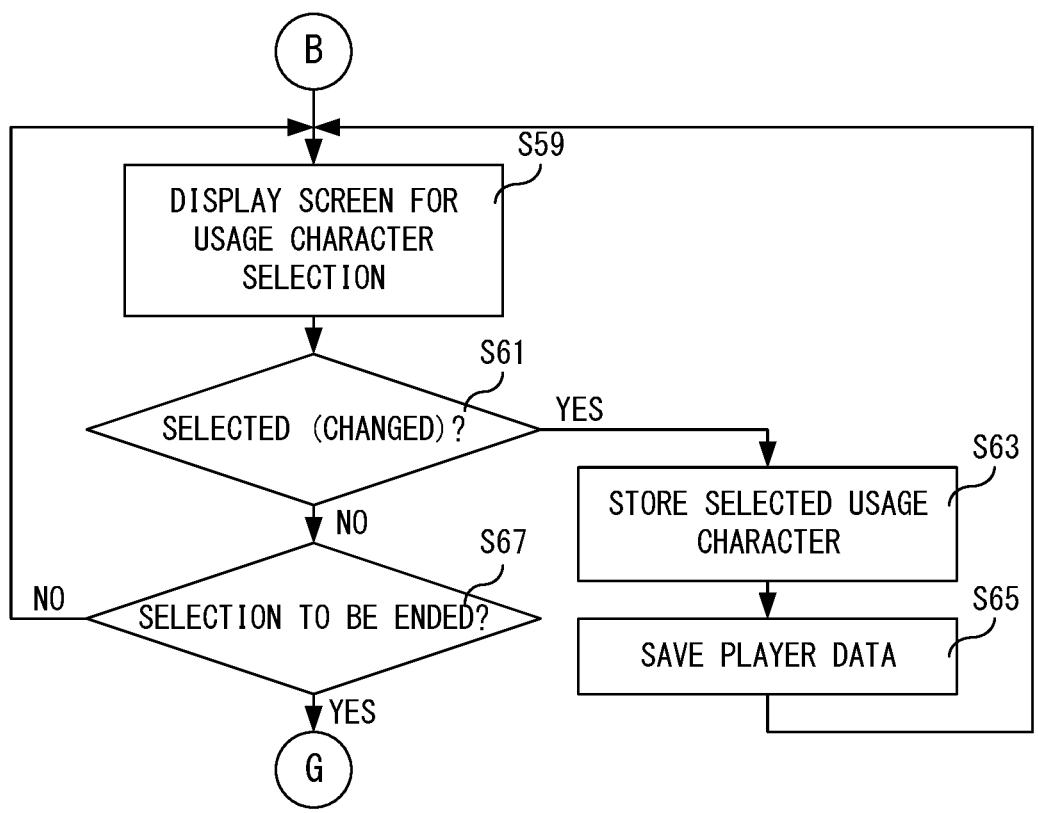
FIG. 16 is a flow chart showing a fourth part of the non-limiting example overall game processing of the CPU incorporated in the game apparatus shown in FIG. 2, following FIG. 13.

Moreover, as described above, if "YES" is determined in the step S7, usage character selection processing is started, and the usage character selection screen 200 as shown in FIG. 5 is displayed on the display 36 in the step S59 shown in FIG. 16, and it is determined in a step S61 selection (change) of the usage character 160 is performed. As described above, in the step S59, by using the image generation data 504b and by referring to the player data 504c, the CPU 20 generates the game image data of the usage character selection screen 200, and the generated game image data is output to the display 36. This is true in steps S69, S85, S97 and S109 to be described later. However, the CPU 20 refers to the player data 504c in also the steps S3, S21, S39, S51, S53 and S57 as necessary.

If "YES" is determined in the step S61, that is, if the usage character is selected (changed), in a step S63, the selected usage character 160 is stored in the RAM 22. That is, the CPU 20 updates the usage character data 512 in the step S63. Then, the player data 504c is saved in a step S65, and the process returns to the step S59.

On the other hand, if "NO" is determined in the step S61, that is, if the usage character 160 is not selected (changed), it is determined in a step S67 whether the usage character selection processing is to be ended. Here, the CPU 20 determines whether the player instructs to end the usage character selection processing.

If "NO" is determined in the step S67, that is, if the usage character selection processing is not to be ended, the process returns to the step S59. On the other hand, if "YES" is determined in the step S67, that is, if the usage character selection processing is to be ended, the process returns to the step S3 shown in FIG. 13.

Figure 17:
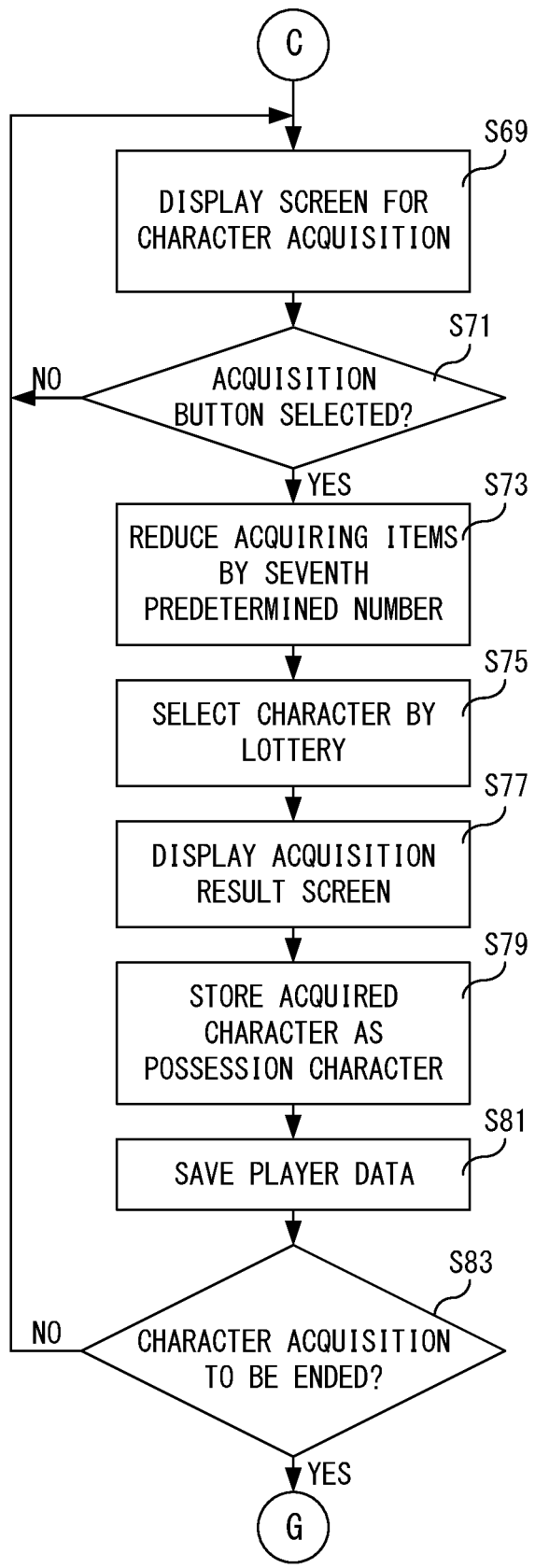
FIG. 17 is a flow chart showing a fifth part of the non-limiting example overall game processing of the CPU incorporated in the game apparatus shown in FIG. 2, following FIG. 13.

Moreover, as described above, if "YES" is determined in the step S9, possession character acquisition processing is started, and the character acquisition screen 250 as shown in FIG. 6 is displayed on the display 36 in the step S69 shown in FIG. 17.

In a next step S71, it is determined whether the acquisition button 252 is selected. If "NO" is determined in the step S71, that is, if the acquisition button 252 is not selected, the process returns to the step S69.

On the other hand, if "YES" is determined in the step S71, that is, if the acquisition button 252 is selected, the acquiring item is reduced by the eighth predetermined number (for example, 5) in a step S73. Here, the CPU 20 updates the acquiring item number data 514 by subtracting the eighth predetermined number.

Subsequently, in a step S75, a character is selected by lottery from all the characters, and in a step S77, the acquisition result screen 300 as shown in FIG. 7 is displayed on the display 36. That is, the acquisition result screen 300 that draws the image 302 of the character selected (acquired) this time and the star image 304 indicating the rarity of that character is displayed on the display 36.

In a subsequent step S79, the character that is acquired this time is stored as the possession character. That is, the possession character data 510 is updated to data that the character acquired this time is added. Next, the player data 504c is saved in a step S81.

Then, it is determined, in a step S83, whether the character acquisition processing is to be ended. Here, the CPU 20 determines whether the player instructs to end the character acquisition processing.

If "NO" is determined in the step S83, that is, if the character acquisition processing is not to be ended, the process returns to the step S69. Therefore, the character acquisition processing of a next character is performed. On the other hand, if "YES" is determined in the step S83, that is, if the character acquisition processing is to be ended, the process returns to the step S3 shown in FIG. 13.

In addition, although it is described here that if the acquisition button 252 is selected, a character can be acquired, in fact, it is impossible to acquire a character when not having the number of the acquiring items required for acquiring a character. Therefore, in the step S83, "YES" is also determined when the player does not have the number of the acquiring items required for acquiring a character.

Figure 18:
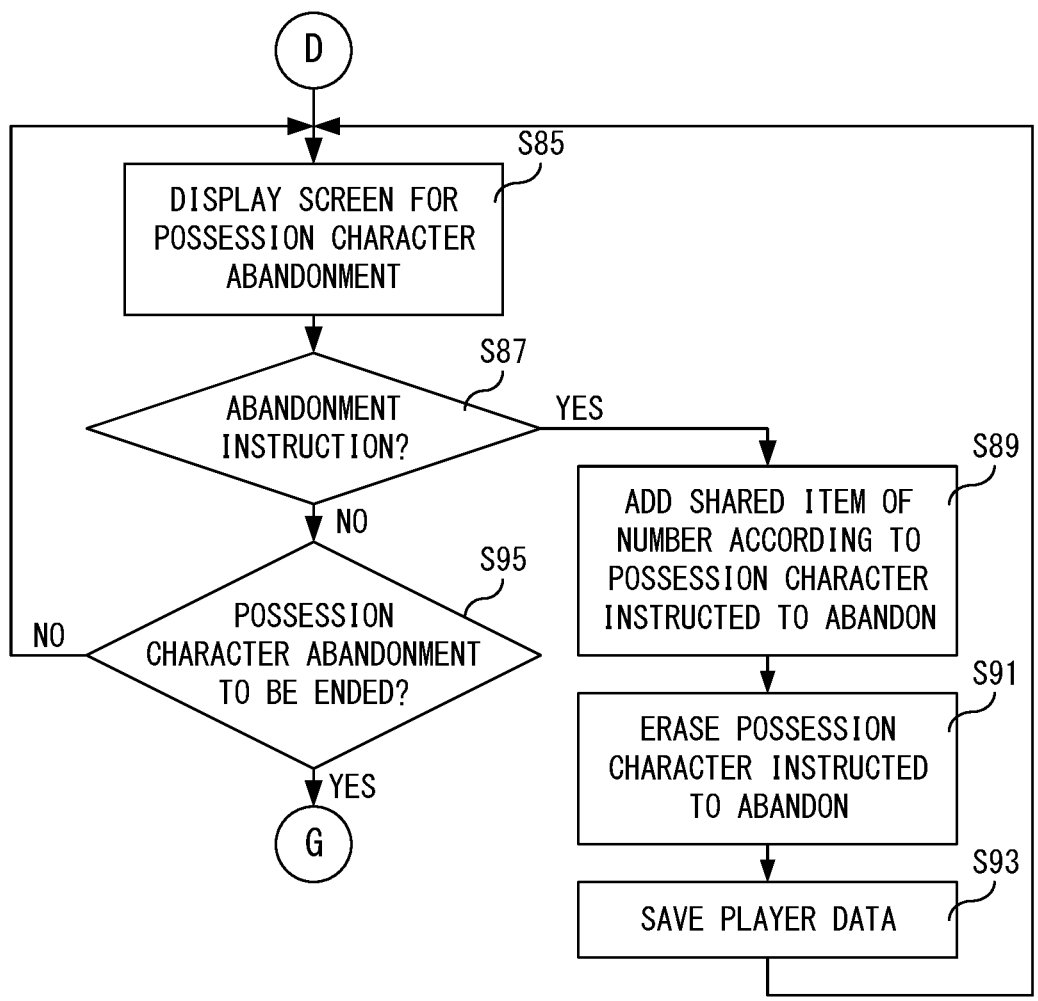
FIG. 18 is a flow chart showing a sixth part of the non-limiting example overall game processing of the CPU incorporated in the game apparatus shown in FIG. 2, following FIG. 13.

Moreover, as described above, if "YES" is determined in the step S11, possession character abandonment processing is started, and the possession character abandonment screen 350 as shown in FIG. 8 is displayed on the display 36 in the step S85 of FIG. 18.

In a next step S87, it is determined whether there is an instruction of abandonment. Here, the CPU 20 determines whether the button 360 is turned on in a state where the face image of the possession character is being selected. If "YES" is determined in the step S87, that is, if there is an abandonment instruction, an addition of the number of shared items according to the possession character that is instructed to be abandoned is performed in a step S89. In this step S89, by referring to the rarity data 5002 about the possession character that is instructed to be abandoned, the CPU 20 writes (updates) the shared item number data 516 to which the number of shared items according to the rarity indicated by the rarity data 5002 is added in the data storage area 504.

In a next step S91, the possession character that is instructed to be abandoned is erased. Here, the CPU 20 deletes the data of the possession character instructed to be abandoned from the possession character data 510. Then, the player data 504c is saved in a step S93, and the process returns to the step S85.

On the other hand, if "NO" is determined in the step S87, that is, if there is no instruction of abandonment, it is determined, in a step S95, whether the possession character abandonment processing is to be ended. Here, the CPU 20 determines whether the button 362 is turned on. If "NO" is determined in the step S95, that is, if there is no instruction to end the possession character abandonment processing, the process returns to the step S85. On the other hand, if "YES" is determined in the step S95, that is, if there is an instruction to end the possession character abandonment processing, the process returns to the step S3 shown in FIG. 13.

Figure 19:
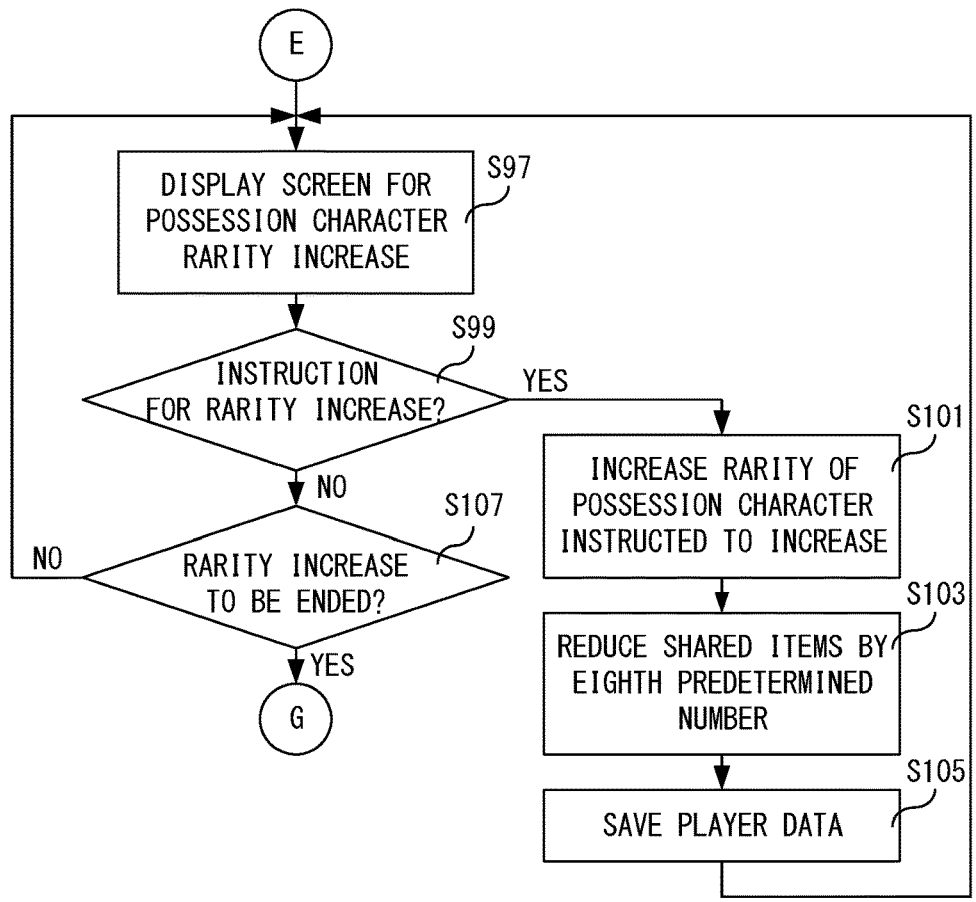
FIG. 19 is a flow chart showing a seventh part of the non-limiting example overall game processing of the CPU incorporated in the game apparatus shown in FIG. 2, following FIG. 13.

Moreover, as described above, if "YES" is determined in the step S13, possession character rarity increase processing is started, and the possession character rarity increase screen 400 as shown in FIG. 9 is displayed on the display 36 in the step S97 of FIG. 19.

In a next step S99, it is determined whether there is an instruction to increase the rarity. Here, the CPU 20 determines whether the button 410 is turned on in a state where the face image of the possession character is being selected. If "YES" is determined in the step S99, that is, if there is an instruction to increase the rarity, the rarity of the possession character that is instructed to be increased is increased in a step S101. Here, the CPU 20 updates the rarity data 5002 by increasing the rarity indicated by the rarity data 5002 about the possession character that is instructed to be increased by one step.

In a next step S103, the shared item is reduced by the eighth predetermined number. Here, the CPU 20 updates the shared item number data 516 by subtracting the eighth predetermined number from the number of the shared items indicated by the shared item number data 516. The eighth predetermined number for subtraction differs according to the rarity to be increased as described above. Then, the player data 504c is saved in a step S105, and the process returns to the step S97.

On the other hand, if "NO" is determined in the step S99, that is, if there is no instruction to increase the rarity, it is determined in a step S107 whether the possession character rarity increase processing is to be ended. Here, the CPU 20 determines whether the button 412 is turned on. If "NO" is determined in the step S107, that is, if the possession character rarity increase processing is not to be ended, the process returns to the step S97. On the other hand, if "YES" is determined in the step S107, that is, if the possession character rarity increase processing is to be ended, the process returns to the step S3 shown in FIG. 13.

Figure 20:
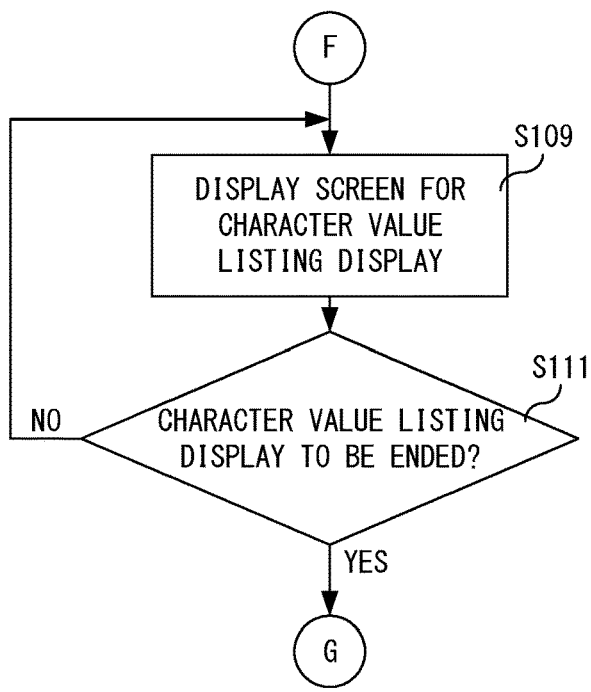
FIG. 20 is a flow chart showing an eighth part of the non-limiting example whole game processing of the CPU incorporated in the game apparatus shown in FIG. 2, following FIG. 13.

Moreover, as described above, if "YES" is determined in the step S15, character value listing display processing is started, and the character value listing display screen 450 as shown in FIG. 10 is displayed on the display 36 in the step S109 of FIG. 20. At this time, the CPU 20 acquires the character value of each of the possession characters with reference to the possession character data 510.

In a subsequent step S111, it is determined whether the character value listing display processing is to be ended. Here, the CPU 20 determines whether there is an instruction to end the character value listing display processing. If "NO" is determined in the step S111, that is, if the character value listing display processing is not to be ended, the process returns to the step S109. If "YES" is determined in the step S111, that is, if the character value listing display processing is to be ended, the process returns to the step S3 shown in FIG. 13.

As described above, in this embodiment, predetermined information processing such as a battle game is performed using the usage character selected from the contents such as possession characters the player owns. A shared item (second parameter) is acquired based on a character value (first parameter) obtained for each usage character according to a result of the predetermined information processing. A content is changed to a further content such as a possession character that rarity is increased by using this shared item.

However, the battle game is an example of the game play using the usage character, it should not be limited, and it is possible to apply the embodiment to a further game in which a usage character that is selected from possession characters is used, a character value (first parameter) is changed according to a result of the play for each usage character, and a shared item (second parameter) is obtained based on the first parameter.

According to this embodiment, the battle game is played using the usage character selected from the possession characters, and the rarity of the possession character is increased based on the shared item that is obtained according to a result of the battle game, and therefore, it is possible to increase the rarity of a possession character other than the predetermined character.

Therefore, when the player owns a desired possession character that the player wishes to increase a level or/and rarity (to nurture), by using the possession character other than the desired possession character in the battle game, it can be used for nurturing the desired possession character. As a result, it becomes easier to encourage possession characters other than the desired possession character to use in the battle game. That is, it improves the use of various possession characters for a battle game.

Moreover, according to the embodiment, since the upper limit of the character value is set, after the character value of the usage character reaches the upper limit, it is impossible to increase the shared item by using the usage character that reaches the upper limit. Therefore, setting the upper limit of the character value further improves the use of possession characters for a battle game.

In addition, although the rarity of the possession character is increased by using the shared item in this embodiment, it does not need to be limited to this. For example, the possession character may be changed to a further character. For example, the further character means a character having an appearance (including costume, hairstyle, etc.) different from an appearance of the character before change, or a character with a color (character itself or color of costume) different from a color of the character before change.

Moreover, although the server manages the game apparatus or the information of the player and player data, and performs authentication processing before the start of the virtual game by using these in this embodiment, it should not be limited to this. The server may be modified to receive operation data from the game apparatus, to perform a part of or all the overall game processing using the operation data, and to transmit a processing result to the game apparatus. In such a case, the player data may be downloaded from the server without being saved in the game apparatus. Moreover, the virtual game may be made to be played only in the game apparatus itself while omitting the server.

Furthermore, although the character value is accumulated, and the sixth predetermined number of shared items are added every time that the accumulated number of the character value reaches the fifth predetermined number in the embodiment, it does not need to be limited to this. The sixth predetermined number of shared items may be added every time that the accumulated number of the subtracted character value reaches the fifth predetermined number while subtracting the character value from an initial value. In such a case, a lower limit is set, and when the character value reaches the lower limit, it becomes motivation using a further possession character.

Furthermore, in this embodiment, when all the enemy characters are brought into a state unable to fight, the player wins the battle, and at the time the player wins, the experience value and the character value are added, but it does not need to be limited to this. For example, when the number of attack turns reaches a predetermined number, the experience value and the character value may be added to the usage character remaining in the game field in a state enable to fight.

Furthermore, the content of game, the configuration of the game apparatus and specific numeral values shown in this embodiment are mere examples and can be appropriately changed according to actual products.

Furthermore, as long as the same effect (result) is obtained, the order of respective steps shown in the flow charts may be appropriately changed.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing system, comprising: a processing system that includes one or more processors, the processing system configured to:
   store in a storage a plurality of possession contents owned by a user;
   store in a storage a first parameter value associated with each of the possession contents;
   store in a storage a second parameter value, the second parameter value increasable by any of the plurality of possession contents and is usable by any of the plurality of possession contents;
   select at least one possession content among the plurality of possession contents as a usage content to be used for predetermined information processing;
   execute the predetermined information processing where the predetermined information processing is a game processing for a battle game where the usage content battles an opponent content and the game processing includes displaying the usage content in a selected virtual region of a plurality of virtual regions along with the opponent content and where the usage content is controlled in the selected virtual region by the user input to battle the opponent content and determining a result of the battle between the usage content and the opponent content;
   change the stored first parameter value associated with the possession content that is selected as the usage content based on the result of the battle, wherein possession contents having a same type form a group, wherein the first parameter value is a same value for each possession content in the group and when multiple possession contents of a group are selected as the usage content, the change in the stored first parameter is larger than when only one possession content of the group is selected;
   remove the usage content from the selected virtual region based on the result of the battle when a strength value is below a threshold, the strength value representing a physical strength of the usage content in the battle;
   change the stored second parameter value according to each stored first parameter value; and
   change a characteristic of any of the plurality of possession contents with utilizing the stored second parameter value, the characteristic being related to the battle or displaying of the possession contents, wherein when a possession content having a changed characteristic is selected as the usage content, the game processing uses the changed characteristic of the possession content, the possession content with the changed characteristic is displayed in a selected virtual region as the usage content and controlled in the selected region by user input to battle an opponent content.

2. The information processing system according to claim 1, wherein the processing system is configured to receive a user selection for changing the characteristic of at least one possession content, and change the characteristic of the selected at least one possession content.

3. The information processing system according to claim 1, wherein the processing system is configured to increase or decrease the first parameter value, and an upper limit or a lower limit is set to the first parameter value.

4. The information processing system according to claim 1, wherein the group includes at least the subset of the plurality of possession contents having different ranks.

5. The information processing system according to claim 4, wherein the rank is a rarity in acquiring a possession content out of a plurality of available possession contents by lottery.

6. The information processing system according to claim 4, wherein the characteristic is the rank and the change increases the rank to a higher rank than the rank of the respective possession content prior to the change.

7. The information processing system according to claim 1, wherein the processing system is configured to change the characteristic so as to be advantageous in the battle.

8. The information processing system according to claim 7, wherein the change in the first parameter value is relative to a strength of -the opponent content.

9. The information processing system according to claim 8, wherein when the strength of the opponent content is a first strength, the first parameter value is changed by a first amount and when the strength of the opponent content is a second strength, the first parameter value is changed by a second amount, where the first strength is less than the second strength, and where the first amount is less than the second amount.

10. The information processing system according to the claim 7, wherein the change in the first parameter value is relative to a difference between a strength of the opponent content and the strength value of the usage content.

11. The information processing system according to claim 10, wherein when the difference is a first difference, the first parameter value is changed by a first amount and when the difference is a second difference, the first parameter value is changed by a second amount, where the first difference is less than the second difference and where the first amount is greater than the second amount.

12. The information processing system according to claim 7, wherein the processing system is configured to change the first parameter value when the usage content is in a state enable to fight at a predetermined time.

13. The information processing system according to claim 1, wherein the processing system is configured to select a plurality of possession contents as the usage content.

14. The information processing system according to claim 13, wherein the processing system is configured to select the same type of possession content as the usage content when there are multiple possession contents of the same type among the plurality of possession contents.

15. The information processing system according to claim 1, wherein the processing system is configured to change the second parameter value at every time the first parameter value exceeds a predetermined threshold value.

16. The information processing system according to claim 1, wherein the second parameter value is increased by abandoning at least one of the plurality of possession contents.

17. The information processing system according to claim 1, wherein the processing system is further configured to display the possession contents in a list together with the first parameter values.

18. The information processing system according to claim 1, wherein the processing system is configured to update the second parameter value when the characteristic of any of the plurality of possession contents is changed.

19. An information processing apparatus, comprising: a processing system that includes one or more processors, the processing system is configured to:
- store in a storage a plurality of possession contents owned by a user;
- store in a storage a first parameter value associated with each of the possession contents;
- store in a storage a second parameter value, the second parameter value increasable by any of the plurality of possession contents and is usable by any of the plurality of possession contents;
- select at least one possession content among the plurality of possession contents as a usage content to be used for predetermined information processing;
- execute the predetermined information processing where the predetermined information processing is a game processing for a battle game where the usage content battles an opponent content and the game processing includes displaying the usage content in a selected virtual region of a plurality of virtual regions along with the opponent content and where the usage content is controlled in the selected virtual region by the user input to battle the opponent content and determining a result of the battle between the usage content and the opponent content;
- change the stored first parameter value associated with the possession content that is selected as the usage content based on a-the result of the battle, wherein possession contents having a same type form a group, wherein the first parameter value is a same value for each possession content in the group and when multiple possession contents of a group are selected as the usage content, the change in the stored first parameter is larger than when only one possession content of the group is selected;
- remove the usage content from the selected virtual region based on the result of the battle when a strength value is below a threshold, the strength value representing a physical strength of the usage content in the battle;
- change the stored second parameter value according to each stored first parameter value; and
- change a characteristic of any of the plurality of possession contents with utilizing the stored second parameter value, the characteristic being related to the battle or displaying of the possession contents, wherein when a possession content having a changed characteristic is selected as the usage content, the game processing uses the changed characteristic of the possession content, the possession content with the changed characteristic is displayed in a selected virtual region as the usage content and controlled in the selected region by user input to battle an opponent content.

20. An information processing server, comprising: a processing system that includes one or more processors, the processing system is configured to:
- store in a storage a plurality of possession contents owned by a user;
- store in a storage a first parameter value associated with each of the possession contents;
- store in a storage a second parameter value, the second parameter value increasable by any of the plurality of possession contents and is usable by any of the plurality of possession contents;
- select at least one possession content among the plurality of possession contents as a usage content to be used for predetermined information processing;
- execute the predetermined information processing where the predetermined information processing is a game processing for a battle game where the usage content battles an opponent content and the game processing includes displaying the usage content in a selected virtual region of a plurality of virtual regions along with the opponent content and where the usage content is controlled in the selected virtual region by the user input to battle the opponent content and determining a result of the battle between the usage content and the opponent content;
- change the stored first parameter value associated with the possession content that is selected as the usage content based on a-the result of the battle, wherein possession contents having a same type form a group, wherein the first parameter value is a same value for each possession content in the group and when multiple possession contents of a group are selected as the usage content, the change in the stored first parameter is larger than when only one possession content of the group is selected;
- remove the usage content from the selected virtual region based on the result of the battle when a strength value is below a threshold, the strength value representing a physical strength of the usage content in the battle;
- change the stored second parameter value according to each stored first parameter value; and
- change a characteristic of any of the plurality of possession contents with utilizing the stored second parameter value, the characteristic being related to the battle or displaying of the possession contents, wherein when a possession content having a changed characteristic is selected as the usage content, the game processing uses the changed characteristic of the possession content, the possession content with the changed characteristic is displayed in a selected virtual region as the usage content and controlled in the selected region by user input to battle an opponent content.

21. A non-transitory computer readable storage medium storing an information processing program that is executable by one or more processors of a computer, wherein the program causes the one or more processors to perform:
- storing in a storage a plurality of possession contents owned by a user;
- storing in a storage a first parameter value associated with each of the possession contents;
- storing in a storage a second parameter value, the second parameter value increasable by any of the plurality of possession contents and is usable by any of the plurality of possession contents;
- selecting at least one possession content among the plurality of possession contents as a usage content for being used for predetermined information processing;
- executing the predetermined information processing where the predetermined information processing is a game processing for a battle game where the usage content battles an opponent content and the game processing includes displaying the usage content in a selected virtual region of a plurality of virtual regions along with the opponent content and where the usage content is controlled in the selected virtual region by the user input to battle the opponent content and determining a result of the battle between the usage content and the opponent content;

changing the stored first parameter value associated with the possession content that is selected as the usage content based on a-the result of battle, wherein possession contents having a same type form a group, wherein the first parameter value is a same value for each possession content in the group and when multiple possession contents of a group are selected as the usage content, the change in the stored first parameter is larger than when only one possession content of the group is selected;

removing the usage content from the selected virtual region based on the result of the battle when a strength value is below a threshold, the strength value representing a physical strength of the usage content in the battle;

changing the stored second parameter value according to a value of each stored first parameter; and changing a characteristic of any of the plurality of possession contents with utilizing the stored second parameter value, the characteristic being related to the battle or displaying of the possession contents, wherein when a possession content having a changed characteristic is selected as the usage content, the game processing uses the changed characteristic of the possession content, the possession content with the changed characteristic is displayed in a selected virtual region as the usage content and controlled in the selected region by user input to battle an opponent content.

22. An information processing method performed by one or more processors of a computer, wherein the method causes the one or more processors to execute:

storing in a storage a plurality of possession contents owned by a user;

storing in the storage a first parameter value associated with each of the possession contents;

storing in the storage a second parameter value, the second parameter value increasable by any of the plurality of possession contents and is usable by any of the plurality of possession contents;

selecting at least one possession content among the plurality of possession contents as a usage content for being used for predetermined information processing;

executing the predetermined information processing where the predetermined information processing is a game processing for a battle game where the usage content battles an opponent content and the game processing includes displaying the usage content in a selected virtual region of a plurality of virtual regions along with the opponent content and where the usage content is controlled in the selected virtual region by the user input to battle the opponent content and determining a result of the battle between the usage content and the opponent content;

changing the stored first parameter value associated with the possession content that is selected as the usage content based on the result of the battle, wherein possession contents having a same type form a group, wherein the first parameter value is a same value for each possession content in the group and when multiple possession contents of a group are selected as the usage content, the change in the stored first parameter is larger than when only one possession content of the group is selected;

removing the usage content from the selected virtual region based on the result of the battle when a strength value is below a threshold, the strength value representing a physical strength of the usage content in the battle;

changing the stored second parameter value according to a value of each stored first parameter; and changing a characteristic of any of the plurality of possession contents with utilizing the stored second parameter value, the characteristic being related to the battle or displaying of the possession contents, wherein when a possession content having a changed characteristic is selected as the usage content, the game processing uses the changed characteristic of the possession content, the possession content with the changed characteristic is displayed in a selected virtual region as the usage content and controlled in the selected region by user input to battle an opponent content.

23. An information processing system, comprising: a processing system that includes one or more processors, the processing system configured to:

store in a storage a plurality of possession contents owned by a user;

store in a storage a first parameter value associated with each of the possession contents;

store in a storage a second parameter value, the second parameter value being usable for each of the plurality of possession contents to change a characteristic of a possession content;

select at least one possession content among the plurality of possession contents as a usage content to be used for predetermined information processing;

execute the predetermined information processing where the predetermined information processing is a game processing for a battle game where the usage content battles an opponent content and the game processing includes displaying the usage content in a selected virtual region of a plurality of virtual regions along with the opponent content and where the usage content is controlled in the selected virtual region by the user input to battle the opponent content and determining a result of the battle between the usage content and the opponent content;

change the stored first parameter value associated with the possession content that is selected as the usage content based on the result of the battle, wherein possession contents having a same type form a group, wherein the first parameter value is a same value for each possession content in the group and when multiple possession contents of a group are selected as the usage content, the change in the stored first parameter is larger than when only one possession content of the group is selected;

remove the usage content from the selected virtual region based on the result of the battle when a strength value is below a threshold, the strength value representing a physical strength of the usage content in the battle;

change the stored second parameter value according to each stored first parameter value;

determine whether a change of a characteristic of a possession content is allowed based on a value of the second parameter value; and change a characteristic of at least one possession content of the plurality of possession contents other than the possession content that is selected as the usage content, respectively, with utilizing the stored second parameter value.

24. The information processing system according to claim 23, wherein the characteristic is a rank and the change is to a higher rank than the rank of the respective possession content prior to the change.

25. The information processing system according to claim 24, wherein the higher rank comprises a higher offensive power, a higher speed and a higher defensive power with respective to an offensive power, a speed and a defensive power of a lower rank.

26. The information processing system according to claim 23, wherein the processing system further comprises enabling an acquisition of new possession contents when a preset condition occurs and adding a new possession content to the plurality of possession contents in response to receipt of a user request to acquire the new possession content, the new possession content being selected from a plurality of available possession contents, each available possession contents having a rank, the rank being a rarity in acquiring the possession content out of the plurality of available possession contents, a higher the rank, a lower of odds of acquiring the possession content, wherein the new possession content is randomly selected.

27. The information processing system according to claim 23, wherein the processing system is further configured to receive an instruction from the user to abandon at least one of the plurality of possession contents, delete the abandoned at least one possession content and increase the second parameter value based on a rank of the abandoned at least one possession content.

28. The information processing system according to claim 23, wherein the processing system is configured to display the at least one possession content having the changed characteristic for selection, wherein when one or more of the at least one possession content having the changed characteristic is selected as the usage content, the processing system is configured to execute the game processing using the selected usage content, the possession content with the changed characteristic is displayed in a selected virtual region as the usage content and controlled in the selected region by user input to battle an opponent content.

* * * * *